(12) United States Patent
Wang et al.

(10) Patent No.: US 12,446,187 B2
(45) Date of Patent: Oct. 14, 2025

(54) HEAT DISSIPATION SYSTEM AND ELECTRONIC DEVICE

(71) Applicant: Huawei Technologies Co., Ltd., Shenzhen (CN)

(72) Inventors: Jianliang Wang, Dongguan (CN); Along Zhou, Yokohama (JP); Huipeng Wu, Dongguan (CN); Jian Shi, Shanghai (CN); Shoubiao Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 18/564,897

(22) PCT Filed: May 26, 2022

(86) PCT No.: PCT/CN2022/095180
§ 371 (c)(1),
(2) Date: Nov. 28, 2023

(87) PCT Pub. No.: WO2022/253091
PCT Pub. Date: Dec. 8, 2022

(65) Prior Publication Data
US 2024/0389264 A1 Nov. 21, 2024

(30) Foreign Application Priority Data
May 29, 2021 (CN) .......................... 202110595876.5

(51) Int. Cl.
*H05K 7/20* (2006.01)

(52) U.S. Cl.
CPC ............................... *H05K 7/20272* (2013.01)

(58) Field of Classification Search
CPC .. H05K 7/20272; H05K 7/20218; H05K 7/20; H05K 7/20327
(Continued)

(56) References Cited

U.S. PATENT DOCUMENTS

| 5,285,347 A | * | 2/1994 | Fox | ........................... G06F 1/20 |
| | | | | 257/714 |
| 5,313,362 A | * | 5/1994 | Hatada | .................... G06F 1/203 |
| | | | | 361/736 |

(Continued)

FOREIGN PATENT DOCUMENTS

| CN | 101989113 B | 5/2013 |
| CN | 106785568 A | 5/2017 |

(Continued)

*Primary Examiner* — Claire E Rojohn, III
(74) *Attorney, Agent, or Firm* — Conley Rose, P.C.

(57) ABSTRACT

A heat dissipation system includes a first heat dissipation panel, a second heat dissipation panel, a first rotating shaft assembly, a second rotating shaft assembly, and a driving apparatus. The first heat dissipation panel is provided with a first liquid channel, and the first liquid channel includes a first interface and a second interface. The second heat dissipation panel is provided with a second liquid channel, and the second liquid channel includes a third interface and a fourth interface. The first interface is in communication with the third interface through the first rotating shaft assembly, and the second interface is in communication with the fourth interface through the second rotating shaft assembly. The driving apparatus is configured to drive a liquid medium to flow between the first heat dissipation panel and the second heat dissipation panel.

20 Claims, 12 Drawing Sheets

(58) Field of Classification Search
USPC ........................................................ 165/80.4
See application file for complete search history.

(56) References Cited

U.S. PATENT DOCUMENTS

| | | | | |
|---|---|---|---|---|
| 5,365,402 A * | 11/1994 | Hatada | ................. | H01L 23/433 |
| | | | | 361/689 |
| 5,381,043 A * | 1/1995 | Kohiyama | ............ | H01R 13/703 |
| | | | | 361/679.41 |
| 5,394,936 A * | 3/1995 | Budelman | ............. | H01L 23/473 |
| | | | | 257/E23.098 |
| 5,757,615 A * | 5/1998 | Donahoe | ................. | G06F 1/203 |
| | | | | 361/679.48 |
| 5,982,616 A * | 11/1999 | Moore | ...................... | G06F 1/20 |
| | | | | 361/679.52 |
| 5,992,155 A * | 11/1999 | Kobayashi | ............ | G06F 1/1628 |
| | | | | 361/679.48 |
| 6,008,986 A * | 12/1999 | Mok | ...................... | G06F 1/1667 |
| | | | | 361/679.54 |
| 6,026,888 A * | 2/2000 | Moore | ...................... | G06F 1/203 |
| | | | | 257/796 |
| 6,069,791 A * | 5/2000 | Goto | ...................... | G06F 1/203 |
| | | | | 361/679.55 |
| 6,075,696 A * | 6/2000 | Progl | ...................... | G06F 1/203 |
| | | | | 361/679.52 |
| 6,181,553 B1 * | 1/2001 | Cipolla | .................... | G06F 1/203 |
| | | | | 361/689 |
| 6,587,336 B2 * | 7/2003 | Chu | ........................ | G06F 1/203 |
| | | | | 361/689 |
| 6,697,253 B2 * | 2/2004 | Minamitani | ........ | F28D 15/0266 |
| | | | | 165/905 |
| 6,725,682 B2 * | 4/2004 | Scott | ........................ | G06F 1/20 |
| | | | | 257/E23.098 |
| 6,741,464 B2 * | 5/2004 | Kitano | .................... | G06F 1/203 |
| | | | | 174/15.2 |
| 6,795,312 B2 * | 9/2004 | Narakino | .............. | F28D 1/0308 |
| | | | | 361/679.55 |
| 7,068,508 B2 * | 6/2006 | Patel | .................... | G06F 1/1632 |
| | | | | 165/104.19 |
| 7,086,452 B1 * | 8/2006 | Senyk | .................... | G06F 1/203 |
| | | | | 174/15.1 |
| 7,113,399 B2 * | 9/2006 | Hisano | ............... | H05K 7/20254 |
| | | | | 361/688 |
| 7,174,738 B2 * | 2/2007 | Scott | ........................ | G06F 1/20 |
| | | | | 257/E23.098 |
| 7,273,088 B2 * | 9/2007 | Malone | .................... | G06F 1/20 |
| | | | | 361/679.48 |
| 7,391,140 B2 * | 6/2008 | Horng | .................... | F04D 25/062 |
| | | | | 310/90 |
| 7,403,392 B2 * | 7/2008 | Attlesey | ............. | H05K 7/20772 |
| | | | | 361/679.48 |
| 7,532,467 B2 * | 5/2009 | Launay | .................... | G06F 1/206 |
| | | | | 361/679.48 |
| 7,609,477 B2 * | 10/2009 | Atarashi | ............... | G11B 33/128 |
| | | | | 360/97.12 |
| 7,791,876 B2 * | 9/2010 | Moore | .................... | G06F 1/203 |
| | | | | 16/221 |
| 8,675,363 B2 * | 3/2014 | Crooijmans | ........... | G06F 1/1624 |
| | | | | 435/303.1 |
| 9,074,825 B2 * | 7/2015 | Satou | ................. | F28D 15/0266 |
| 9,148,979 B2 * | 9/2015 | Chiriac | .................... | G06F 1/203 |
| 9,243,432 B2 * | 1/2016 | Lee | ........................ | G06F 1/1681 |
| 9,268,377 B2 * | 2/2016 | MacDonald | ............ | G06F 1/203 |
| 9,426,930 B2 * | 8/2016 | Atkinson | ............ | H05K 7/20518 |
| D773,452 S * | 12/2016 | Cheah | ......................... | D14/315 |
| 9,801,290 B2 * | 10/2017 | Ahn | ........................ | H05K 5/0217 |
| D802,583 S * | 11/2017 | Oakley | ........................ | D14/315 |
| 9,872,390 B1 * | 1/2018 | Holbery | ................ | H01L 21/486 |
| D811,393 S * | 2/2018 | Ahn | ............................. | D14/371 |
| 9,930,794 B2 * | 3/2018 | Luan | .................... | G06F 1/1652 |
| 9,947,883 B2 * | 4/2018 | Choi | .................... | H10K 77/111 |
| 9,980,412 B2 * | 5/2018 | Qiu | ........................ | H05K 1/0203 |
| 9,983,627 B1 * | 5/2018 | Pelissier | ............... | G06F 1/1681 |
| 10,024,090 B2 * | 7/2018 | Tazbaz | ...................... | E05D 3/06 |
| 10,321,605 B2 * | 6/2019 | Norton | ............... | H05K 7/20336 |
| 10,331,177 B2 * | 6/2019 | Ghosh | .................... | G06F 1/1681 |
| 10,338,650 B1 * | 7/2019 | Keilers | ...................... | G06F 1/20 |
| 10,359,241 B2 * | 7/2019 | Morrison | ............ | H05K 7/2039 |
| 10,401,926 B1 * | 9/2019 | North | .................... | G06F 1/1618 |
| 10,488,898 B2 * | 11/2019 | Shah | .................... | G06F 1/1681 |
| 10,579,112 B2 * | 3/2020 | North | .................... | G06F 1/1637 |
| 10,579,113 B2 * | 3/2020 | North | ...................... | G06F 1/206 |
| 10,802,555 B2 * | 10/2020 | North | ............... | H05K 7/20336 |
| 10,802,556 B2 * | 10/2020 | North | ............... | H05K 7/20272 |
| 10,936,031 B2 * | 3/2021 | North | .................... | G06F 1/1616 |
| 10,969,841 B2 * | 4/2021 | North | ...................... | G06F 1/181 |
| 11,231,757 B2 * | 1/2022 | Kurma Raju | ........... | G06F 1/203 |
| 11,622,470 B2 * | 4/2023 | Rohena | ............... | H05K 7/20263 |
| | | | | 361/699 |
| 11,744,045 B2 * | 8/2023 | Lin | ........................ | G06F 1/1681 |
| | | | | 361/679.54 |
| 12,158,308 B2 * | 12/2024 | Chen | .................... | G06F 1/1681 |
| 12,181,935 B2 * | 12/2024 | Hsiang | .................... | G06F 1/1624 |
| 2005/0083647 A1 | 4/2005 | Neho et al. | | |
| 2008/0259566 A1 * | 10/2008 | Fried | ................. | H05K 7/20809 |
| | | | | 165/80.4 |
| 2016/0116944 A1 * | 4/2016 | Lee | ........................ | G06F 1/1681 |
| | | | | 361/679.26 |
| 2016/0132077 A1 * | 5/2016 | Cheah | ................. | E05D 11/0081 |
| | | | | 361/679.09 |
| 2017/0058590 A1 * | 3/2017 | Carullo | .................... | E05D 7/14 |
| 2017/0092405 A1 * | 3/2017 | Manahan | ................ | H05K 7/20 |
| 2017/0185104 A1 * | 6/2017 | Krivoy | .................... | G06F 1/1681 |
| 2017/0254127 A1 * | 9/2017 | Uchiyama | ............. | G06F 1/1601 |
| 2017/0322598 A1 * | 11/2017 | Fujimoto | ............... | G06F 3/0412 |
| 2018/0059740 A1 * | 3/2018 | Kato | ........................ | E05D 3/06 |
| 2018/0067520 A1 * | 3/2018 | Määttä | .................... | G06F 1/1681 |
| 2018/0246546 A1 * | 8/2018 | Ghosh | .................... | G06F 1/1681 |
| 2019/0045662 A1 * | 2/2019 | Schroeder | .......... | H05K 7/20263 |
| 2019/0206763 A1 * | 7/2019 | Xu | ........................ | H01L 23/467 |
| 2019/0269042 A1 * | 8/2019 | Bonnin | ............... | H05K 7/20836 |
| 2019/0317571 A1 * | 10/2019 | North | .................... | H05K 7/2039 |
| 2019/0317572 A1 * | 10/2019 | North | ...................... | G06F 1/203 |
| 2019/0317574 A1 * | 10/2019 | North | ...................... | G06F 1/203 |
| 2019/0317575 A1 * | 10/2019 | North | ...................... | G06F 1/181 |
| 2019/0317576 A1 * | 10/2019 | North | .................... | G06F 1/1616 |
| 2019/0317578 A1 * | 10/2019 | North | ...................... | G06F 1/206 |
| 2020/0185306 A1 * | 6/2020 | Xiao | ...................... | H01L 23/467 |
| 2020/0245501 A1 * | 7/2020 | Wu | ......................... | F28F 3/02 |
| 2021/0051818 A1 * | 2/2021 | Cao | .................... | H05K 7/20418 |
| 2021/0109575 A1 * | 4/2021 | Yang | ...................... | G06F 1/203 |
| 2023/0232578 A1 * | 7/2023 | Fan | ................... | H05K 7/20272 |
| | | | | 415/90 |
| 2024/0164053 A1 * | 5/2024 | Wang | ...................... | G06F 1/203 |
| 2024/0164056 A1 * | 5/2024 | Wu | ................... | H05K 7/20272 |
| 2024/0389264 A1 * | 11/2024 | Wang | ............... | H05K 7/20272 |
| 2025/0152923 A1 * | 5/2025 | Li | ........................ | A61M 25/104 |

FOREIGN PATENT DOCUMENTS

| | | |
|---|---|---|
| CN | 110418549 A | 11/2019 |
| CN | 111443786 A | 7/2020 |
| CN | 112506319 A | 3/2021 |
| CN | 114063743 A | 2/2022 |
| JP | 2003022148 A | 1/2003 |
| JP | 2004127288 A | 4/2004 |
| JP | 2007241962 A | 9/2007 |
| WO | 2006025852 A2 | 3/2006 |

* cited by examiner

HEAT DISSIPATION SYSTEM AND ELECTRONIC DEVICE

CROSS-REFERENCE TO RELATED APPLICATIONS

This is a U.S. National Stage of International Patent Application No. PCT/CN2022/095180 filed on May 26, 2022, which claims priority to Chinese Patent Application No. 202110595876.5 filed on May 29, 2021. Both of the aforementioned applications are hereby incorporated by reference in their entireties.

TECHNICAL FIELD

This application relates to the field of heat dissipation technologies, and in particular, to a heat dissipation system and an electronic device.

BACKGROUND

Currently, a large proportion of electronic devices, especially portable electronic devices, resolve a heat dissipation problem of the electronic device through natural heat dissipation. The electronic device is developed to be light, thin, and small, so that the electronic device is easy to carry. It is well known that a natural heat dissipation capability of an electronic device is limited by a heat dissipation area of the electronic device, and a passive heat dissipation element with high heat conductivity, for example, a heat pipe, a phase change film, or a graphite film, is usually used to transfer heat generated by a heat source to each heat dissipation element as much as possible, to distribute the heat evenly to a large heat dissipation plane. However, these passive heat dissipation elements can transmit a small quantity of heat or cannot be folded.

A laptop is used as an example. The laptop includes a keyboard side and a screen side, and a heat dissipation element is disposed on both sides. As a capability of a processor of the laptop becomes increasingly powerful, power consumption of a chip of the laptop increases. The chip with high power consumption of the laptop is usually disposed on the keyboard side, and the screen side is mainly used for disposing a display screen. As a result, a temperature on the keyboard side is high, and a temperature on the screen side is low. Therefore, heat on the keyboard side needs to be transferred to the screen side as much as possible, so that the heat on the keyboard side can be further dissipated by using the heat dissipation element on the screen side. Because the heat pipe cannot be folded, the heat pipe cannot be disposed across a hinge of the laptop. Therefore, the heat on the keyboard side cannot be transferred to the screen side through the heat pipe. In addition, although the phase change film and the graphite film can be disposed across the hinge, heat dissipated by the phase change film and the graphite film is little. Therefore, the phase change film and the graphite film fail to meet a heat dissipation requirement of the laptop. Based on this, currently, because heat generated by the chip on the keyboard side can be diffused only on the keyboard side, that is, a heat dissipation area is limited, the temperature on the keyboard side is still high.

Therefore, how to provide an electronic device with a heat dissipation system that can multiply a heat dissipation area of the heat dissipation system to multiply a natural heat dissipation capability of the electronic device and that is safe and reliable has become an urgent problem to be resolved by a person skilled in the art.

SUMMARY

This application provides a heat dissipation system and an electronic device, to improve a heat dissipation capability of the heat dissipation system by multiplying a heat dissipation area of the heat dissipation system.

According to a first aspect of this application, a heat dissipation system is provided. The heat dissipation system may include a first heat dissipation panel, a second heat dissipation panel, a first rotating shaft assembly, a second rotating shaft assembly, and a driving apparatus. The first heat dissipation panel, the second heat dissipation panel, the first rotating shaft assembly, and the second rotating shaft assembly may form a circulation channel of a liquid medium, and the driving apparatus may be configured to drive the liquid medium to flow in the circulation channel. During specific implementation, the first heat dissipation panel is provided with a first liquid channel, and the first liquid channel includes a first interface and a second interface. The second heat dissipation panel is provided with a second liquid channel, and the second liquid channel includes a third interface and a fourth interface. The first rotating shaft assembly includes a first rotating shaft and a second rotating shaft, the second rotating shaft is a hollow shaft, and the first rotating shaft is rotatably connected to the second rotating shaft. The second rotating shaft assembly includes a third rotating shaft and a fourth rotating shaft, the fourth rotating shaft is a hollow shaft, and the third rotating shaft is rotatably connected to the fourth rotating shaft. The driving apparatus includes a liquid outlet and a liquid inlet, the liquid outlet is connected to the first interface, the second interface is connected to the third interface through the second rotating shaft, and the fourth interface is connected to the liquid inlet through the fourth rotating shaft.

In this way, under an action of driving force of the driving apparatus, the liquid medium may flow out from the liquid outlet of the driving apparatus and enter the first liquid channel through the first interface. The liquid medium flows out from the second interface after flowing through the first heat dissipation panel. Thereafter, the liquid medium flows through the first rotating shaft assembly and enters the second liquid channel from the third interface. The liquid medium flows out from the fourth interface after flowing through the second heat dissipation panel. Finally, after flowing through the second rotating shaft assembly, the liquid medium enters the driving apparatus through the liquid inlet. At this point, one time of circulation of the liquid medium in the heat dissipation system is completed. According to the heat dissipation system provided in this application, heat balancing can be implemented by circulating the liquid medium between two heat dissipation panels, and a heat dissipation area of the heat dissipation system is expanded, to improve heat exchange performance between the heat dissipation system and an external environment.

In a possible implementation of this application, the second rotating shaft includes a fifth interface and a sixth interface, and the fourth rotating shaft includes a seventh interface and an eighth interface. In this implementation, the second rotating shaft and the fourth rotating shaft may be used as channels for liquid circulation. During specific implementation, the second interface is connected to the fifth interface, the sixth interface is connected to the third interface, the fourth interface is connected to the seventh interface, and the eighth interface is connected to the liquid inlet. In this way, when rotating shaft assembly accommodating space of the electronic device is compact, stable flowing of the liquid medium can also be implemented. Therefore, heat dissipation performance of an electronic device can be effectively improved.

In a possible implementation of this application, the eighth interface of the fourth rotating shaft may be connected to the liquid inlet of the driving apparatus through a first hose, to connect the fourth rotating shaft to the driving apparatus. A first end of the first hose may be crimped with the eighth interface through a metal crimping ring, and a second end of the first hose may be crimped with the liquid inlet through a metal crimping ring, to implement sealing between the eighth interface and the liquid inlet. In addition, the fourth rotating shaft is connected to the driving apparatus through the first hose, so that the first hose may deform when the first heat dissipation panel and the second heat dissipation panel rotate relative to each other, to absorb a portion of twisting. Therefore, structural reliability of the heat dissipation system is improved, and a risk of liquid leakage in the heat dissipation system is reduced.

Similarly, the second interface of the first heat dissipation panel and the fifth interface of the second rotating shaft may be connected through a second hose. A first end of the second hose may be crimped with the second interface through a metal crimping ring, and a second end of the second hose may be crimped with the fifth interface through a metal crimping ring, to implement sealing between the second interface and the fifth interface. In addition, the first heat dissipation panel is connected to the second rotating shaft through the second hose, so that the second hose may deform when the first heat dissipation panel and the second heat dissipation panel rotate relative to each other, to absorb a portion of twisting. Therefore, structural reliability of the heat dissipation system is improved, and a risk of liquid leakage in the heat dissipation system is reduced.

In a possible implementation of this application, when the second heat dissipation panel is connected to the second rotating shaft, the third interface of the second heat dissipation panel may be connected to the sixth interface of the second rotating shaft through a third hose. During specific implementation, a first end of the third hose is crimped with the sixth interface through a metal crimping ring, and a second end of the third hose is crimped with the third interface through a metal crimping ring, to implement sealing between the third interface and the fifth interface. In addition, the second heat dissipation panel is connected to the second rotating shaft through the third hose, so that the third hose may deform when the first heat dissipation panel and the second heat dissipation panel rotate relative to each other, to absorb a portion of twisting. Therefore, structural reliability of the heat dissipation system is improved, and a risk of liquid leakage in the heat dissipation system is reduced.

In addition, when the second heat dissipation panel is connected to the fourth rotating shaft, the fourth interface of the second heat dissipation panel may be connected to the seventh interface of the fourth rotating shaft through a fourth hose. A first end of the fourth hose is crimped with the fourth interface through a metal crimping ring, and a second end of the fourth hose is crimped with the seventh interface through a metal crimping ring, to implement sealing between the fourth interface and the seventh interface. The second heat dissipation panel is connected to the second rotating shaft through the third hose, so that the third hose may deform when the first heat dissipation panel and the second heat dissipation panel rotate relative to each other, to absorb a portion of twisting. Therefore, structural reliability of the heat dissipation system is improved, and a risk of liquid leakage in the heat dissipation system is reduced.

In a possible implementation of this application, the sixth interface and the third interface may alternatively be connected by forming a nested structure. For example, the sixth interface is nested in the third interface, and the sixth interface is fixedly connected to the third interface.

Similarly, the seventh interface and the fourth interface may alternatively be connected by forming a nested structure. For example, the seventh interface is nested in the fourth interface, and the sixth interface is fixedly connected to the third interface.

In another possible implementation of this application, the sixth interface is nested in the third interface, a sealing ring is disposed between the sixth interface and the third interface, and the sealing ring is in interference fit with the sixth interface and the third interface, to implement sealing between the sixth interface and the third interface, and reduce a risk of liquid leakage at the sixth interface and the third interface.

Similarly, the seventh interface may be nested in the fourth interface, a sealing ring is disposed between the seventh interface and the fourth interface, and the sealing ring is in interference fit with the seventh interface and the fourth interface, to implement sealing between the seventh interface and the fourth interface, and reduce a risk of liquid leakage at the seventh interface and the fourth interface.

In another possible implementation of this application, the heat dissipation system further includes a nested mechanical part, and the nested mechanical part is sleeved at a joint between the sixth interface and the third interface. In addition, a first sealing ring may be disposed between the nested mechanical part and the sixth interface, and the first sealing ring is in interference fit with the nested mechanical part and the sixth interface, to implement sealing between the nested mechanical part and the sixth interface. A second sealing ring may further be disposed between the nested mechanical part and the third interface, and the second sealing ring is in interference fit with the nested mechanical part and the third interface, to implement sealing between the nested mechanical part and the third interface, and reduce a risk of liquid leakage at the sixth interface and the third interface.

In a possible implementation of this application, the sixth interface is rotatably connected to the third interface, so that when the first heat dissipation panel and the second heat dissipation panel rotate relative to each other, a portion of twisting can be absorbed through relative rotation between the sixth interface and the third interface. Therefore, structural reliability of the heat dissipation system is improved.

In addition, the seventh interface and the fourth interface may alternatively be rotatably connected, so that a portion of twisting can be absorbed through relative rotation between the sixth interface and the third interface. Therefore, structural reliability of the heat dissipation system is improved.

In a possible implementation of this application, the heat dissipation system further includes a fifth hose, the fifth hose penetrates the second rotating shaft, a first end of the fifth hose is connected to the second interface, and a second end of the fifth hose is connected to the third interface; and/or the heat dissipation system further includes a sixth hose, the sixth hose passes through the fourth rotating shaft, a first end of the sixth hose is connected to the fourth interface, and a second end of the sixth hose is connected to the liquid inlet. In this way, a structure of the heat dissipation system may be effectively simplified. In addition, when the first heat dissipation panel and the second heat dissipation panel rotate relative to each other, the fifth hose and/or the sixth hose may absorb a portion of twisting. Therefore, structural reliability of the heat dissipation system is improved.

In this application, to implement a light and thin design of the electronic device, when the first heat dissipation panel is specifically disposed, a thickness of the first heat dissipation panel is small. To facilitate a connection between two interfaces of the first heat dissipation panel and another interface, in a possible implementation of this application, the first heat dissipation panel may include a first adapter and a second adapter. The first adapter is in communication with the first liquid channel, the first adapter is provided with a first connector, and the first connector may be used as the first interface of the first heat dissipation panel. In addition, the second adapter is in communication with the first liquid channel, the second adapter is provided with a second connector, and the second connector may be used as the second interface of the first heat dissipation panel. It may be understood that, in this application, cross-sectional areas of the first adapter and the second adapter may be further adjusted to adjust through-flow areas of the first adapter and the second adapter, to ensure smoothness of the liquid medium when the liquid medium flows through the first heat dissipation panel.

A thickness of the second heat dissipation panel is usually small. In a possible implementation of this application, the second heat dissipation panel includes a third adapter and a fourth adapter. The third adapter is in communication with the second liquid channel, the third adapter is provided with a third connector, and the third connector may be used as the third interface of the second heat dissipation panel. Similarly, the fourth adapter is connected to the second liquid channel, the fourth adapter is provided with a fourth connector, and the fourth connector is used as the fourth interface of the second heat dissipation panel. The third adapter and the fourth adapter are disposed, so that the second heat dissipation panel may be connected to another interface through the third connector and the fourth connector. Moreover, a connection manner of the second heat dissipation panel may be simplified. In addition, cross-sectional areas of the third adapter and the fourth adapter may be further adjusted to adjust through-flow areas of the third adapter and the fourth adapter, to ensure smoothness of the liquid medium when the liquid medium flows through the second heat dissipation panel.

Because the first rotating shaft assembly and the second rotating shaft assembly may be usually disposed in a rotating shaft housing of the electronic device, to avoid interference between the first heat dissipation panel and the second heat dissipation panel and the rotating shaft housing when the first heat dissipation panel and the second heat dissipation panel rotate relative to each other, in a possible implementation of this application, the third adapter may include a fastening part and a bending part. The fastening part is configured to be fixedly connected to the second heat dissipation panel, and the bending part is bent from the fastening part toward a direction of the first heat dissipation panel. In this application, the bending part may be extended into the rotating shaft housing. In addition, the third connector may be disposed at an end that is of the bending part and that faces away from the fastening part, so that the third interface is disposed in the rotating shaft housing. Therefore, the third connector may be connected to the second interface of the second rotating shaft.

It may be understood that, in a possible implementation of this application, the third connector and the second rotating shaft may be further coaxially disposed, so that when the first heat dissipation panel and the second heat dissipation panel rotate relative to each other, deformation is absorbed through relative twisting of the third connector and the second rotating shaft on an axis rather than through bending. This may prevent causing an excessively large resistance to a liquid medium flowing through the third connector and the second rotating shaft, so that the liquid medium can flow smoothly, and structural reliability of the heat dissipation system may be improved.

According to a second aspect of this application, an electronic device is provided. The electronic device includes a first housing, a second housing, and the heat dissipation system in the first aspect. Rotating shaft accommodating space is provided between the first housing and the second housing, and a first rotating shaft assembly and a second rotating shaft assembly may be disposed in the rotating shaft accommodating space. In addition, the first housing and the second housing may be rotatably connected through the first rotating shaft assembly and the second rotating shaft assembly. A first heat dissipation panel and a driving apparatus of the heat dissipation system may be disposed in the first housing, and a second heat dissipation panel of the heat dissipation system may be disposed in the second housing.

According to the electronic device provided in this application, heat generated by a heat emitting element in the first housing may be transferred to a liquid medium in the first heat dissipation panel, and the liquid medium carries the heat and enters the second heat dissipation panel through the first rotating shaft assembly. Therefore, a large portion of the heat generated on a first housing side may be effectively transferred to the second housing through a rotating shaft region and dissipated to an environment through the second housing. A heat dissipation area may be multiplied by using the heat dissipation system, and a natural heat dissipation capability of the electronic device is multiplied. In this way, temperature rises of two housings of the electronic device are not obvious when the electronic device operates, to improve user experience.

In a possible implementation of this application, to rotatably connect the first housing and the second housing, a first rotating shaft may include a first sleeve and a first connecting part, the first sleeve is fixedly connected to the first connecting part, the first sleeve sleeves on a second rotating shaft, and the first connecting part is fastened to the second housing. A third rotating shaft includes a second sleeve and a second connecting part, the second sleeve is fixedly connected to the second connecting part, the second sleeve sleeves on a fourth rotating shaft, and the second connecting part is fastened to the second housing. In addition, the second rotating shaft and the fourth rotating shaft may be fastened to the first housing. In this way, when the first housing and the second housing rotate relative to each other, the first rotating shaft rotates around the second rotating shaft, and the third rotating shaft rotates around the fourth rotating shaft.

According to a third aspect, this application further provides a heat dissipation system. The heat dissipation system includes a first heat dissipation panel, a second heat dissipation panel, a first connection assembly, a second connection assembly, and a driving apparatus. The first heat dissipation panel is provided with a first liquid channel, and the first liquid channel includes a first interface and a second interface. The second heat dissipation panel is provided with a second liquid channel, and the second liquid channel includes a third interface and a fourth interface. The first connection assembly includes a first connecting piece and a second connecting piece, the first connecting piece includes a ninth interface and a tenth interface, and the second connecting piece includes an eleventh interface and a twelfth interface. The ninth interface is connected to the third interface, the tenth interface is connected to the eleventh interface through a first connecting pipe, and the twelfth interface is connected to the second interface. The second connection assembly includes a third connecting piece and a fourth connecting piece, the third connecting piece includes a thirteenth interface and a fourteenth interface, and the fourth connecting piece includes a fifteenth interface and a sixteenth interface. The driving apparatus includes a liquid outlet and a liquid inlet, the thirteenth interface is connected to the liquid inlet, the fourteenth interface is connected to the fifteenth interface through a second connecting pipe, and the sixteenth interface is connected to the fourth interface. In addition, in this implementation, the first connecting pipe and the second connecting pipe may be hoses, so that the first connecting pipe and the second connecting pipe may deform when the first heat dissipation panel and the second heat dissipation panel rotate relative to each other, to absorb a portion of twisting. Therefore, structural reliability of the heat dissipation system is improved, and a risk of liquid leakage in the heat dissipation system is reduced.

According to the heat dissipation system provided in this application, a driving rotating shaft may drive a liquid medium to circularly flow between the first heat dissipation panel, the second heat dissipation panel, the first connection assembly, and the second connection assembly. When the liquid medium circulates in the heat dissipation system, heat generated by the electronic device may be brought to various locations of the heat dissipation system, to implement temperature balance effect. This helps increase an area in which the heat dissipation system exchanges heat with an external environment, so that heat dissipation performance of the heat dissipation system is improved.

In a possible implementation of this application, the twelfth interface may be connected to the second interface through a seventh hose. Similarly, the sixteenth interface may be connected to the fourth interface through an eighth hose. In this way, the seventh hose and the eighth hose may deform when the first heat dissipation panel and the second heat dissipation panel rotate relative to each other, to absorb a portion of twisting. Therefore, structural reliability of the heat dissipation system is improved, and a risk of liquid leakage in the heat dissipation system is reduced.

In this application, to implement a light and thin design of the electronic device, when the first heat dissipation panel is specifically disposed, a thickness of the first heat dissipation panel is small. To facilitate a connection between two interfaces of the first heat dissipation panel and another interface, in a possible implementation of this application, the first heat dissipation panel may include a first adapter and a second adapter. The first adapter is in communication with the first liquid channel, the first adapter is provided with a first connector, and the first connector may be used as the first interface of the first heat dissipation panel. In addition, the second adapter is in communication with the first liquid channel, the second adapter is provided with a second connector, and the second connector may be used as the second interface of the first heat dissipation panel. It may be understood that, in this application, cross-sectional areas of the first adapter and the second adapter may be further adjusted to adjust through-flow areas of the first adapter and the second adapter, to ensure smoothness of the liquid medium when the liquid medium flows through the first heat dissipation panel.

A thickness of the second heat dissipation panel is usually small. In a possible implementation of this application, the second heat dissipation panel includes a third adapter and a fourth adapter. The third adapter is in communication with the second liquid channel, the third adapter is provided with a third connector, and the third connector may be used as the third interface of the second heat dissipation panel. Similarly, the fourth adapter is connected to the second liquid channel, the fourth adapter is provided with a fourth connector, and the fourth connector is used as the fourth interface of the second heat dissipation panel. The third adapter and the fourth adapter are disposed, so that the second heat dissipation panel may be connected to another interface through the third connector and the fourth connector. Moreover, a connection manner of the second heat dissipation panel may be simplified. In addition, cross-sectional areas of the third adapter and the fourth adapter may be further adjusted to adjust through-flow areas of the third adapter and the fourth adapter, to ensure smoothness of the liquid medium when the liquid medium flows through the second heat dissipation panel.

Because the first rotating shaft assembly and the second rotating shaft assembly may be usually disposed in a rotating shaft housing of the electronic device, to avoid interference between the first heat dissipation panel and the second heat dissipation panel and the rotating shaft housing when the first heat dissipation panel and the second heat dissipation panel rotate relative to each other, in a possible implementation of this application, the third adapter may include a fastening part and a bending part. The fastening part is configured to be fixedly connected to the second heat dissipation panel, and the bending part is bent from the fastening part toward a direction of the first heat dissipation panel. In this application, the bending part may be extended into the rotating shaft housing. In addition, the third connector may be disposed at an end that is of the bending part and that faces away from the fastening part, so that the third interface is disposed in the rotating shaft housing. Therefore, the third connector may be connected to the second interface of the second rotating shaft.

It may be understood that, in a possible implementation of this application, the third connector and the second rotating shaft may be further coaxially disposed, so that when the first heat dissipation panel and the second heat dissipation panel rotate relative to each other, deformation is absorbed through relative twisting of the third connector and the second rotating shaft on an axis rather than through bending. This may prevent causing an excessively large resistance to a liquid medium flowing through the third connector and the second rotating shaft, so that the liquid medium can flow smoothly, and structural reliability of the heat dissipation system may be improved.

According to a fourth aspect, this application further provides an electronic device. The electronic device includes a first housing, a second housing, and the heat dissipation system in the third aspect. Rotating shaft accommodating space is provided between the first housing and the second housing, and the heat dissipation system may further include a first rotating shaft assembly and a second rotating shaft assembly. The first rotating shaft assembly and the second rotating shaft assembly may be disposed in the rotating shaft accommodating space, and the first rotating shaft assembly and the second rotating shaft assembly may serve as a supporting component of a first heat dissipation panel and a second heat dissipation panel when the first heat dissipation panel and the second heat dissipation panel rotate relative to each other. The first rotating shaft assembly includes a first rotating shaft and a second rotating shaft, the first rotating shaft is sleeved on the second rotating shaft, and the first rotating shaft is rotatably connected to the second rotating shaft. The second rotating shaft assembly includes a third rotating shaft and a fourth rotating shaft, the third rotating shaft is sleeved on the fourth rotating shaft, and the third rotating shaft is rotatably connected to the fourth rotating shaft.

In addition, a first connecting pipe may be coaxially disposed with the second rotating shaft and the fourth rotating shalt, so that deformation may be absorbed through twisting of the first connecting pipe on an axis. This may avoid severe contraction of a cross section of the first connecting pipe due to collapse of the first connecting pipe during twisting, thereby further preventing causing an excessively large resistance or a complete blockage to flowing of a liquid medium, and allowing the liquid medium to flow smoothly. In addition, the first connecting pipe, and the first connecting piece and the second connecting piece that are connected through the first connecting pipe may be hidden in a rotating shaft housing used for disposing the first rotating shaft assembly and the second rotating shaft assembly. Therefore, appearance of the electronic device is neater.

Similarly, the second connecting pipe may also be coaxially disposed with the second rotating shaft and the fourth rotating shall, so that deformation may be absorbed through twisting of the second connecting pipe on an axis. This may avoid severe contraction of a cross section of the second connecting pipe due to collapse of the second connecting pipe during twisting, thereby further preventing causing an excessively large resistance or a complete blockage to flowing of a liquid medium, and allowing the liquid medium to flow smoothly. In addition, the second connecting pipe, and the third connecting piece and the fourth connecting piece that are connected through the second connecting pipe may be hidden in a rotating shaft housing used for disposing the first rotating shaft assembly and the second rotating shaft assembly. Therefore, appearance of the electronic device is neater.

According to a fifth aspect, this application further provides a rotating shaft assembly, where the rotating shaft assembly includes a first rotating shaft and a second rotating shaft, the first rotating shaft is rotatably connected to the second rotating shaft, and the second rotating shaft is a hollow shall. Two ends of the second rotating shaft are separately provided with a pagoda connector. The two ends of the second rotating shaft are arranged as pagoda connectors. This facilitates a connection between the second rotating shaft and other hollow pipes.

REFERENCE NUMERALS

Figure 1:
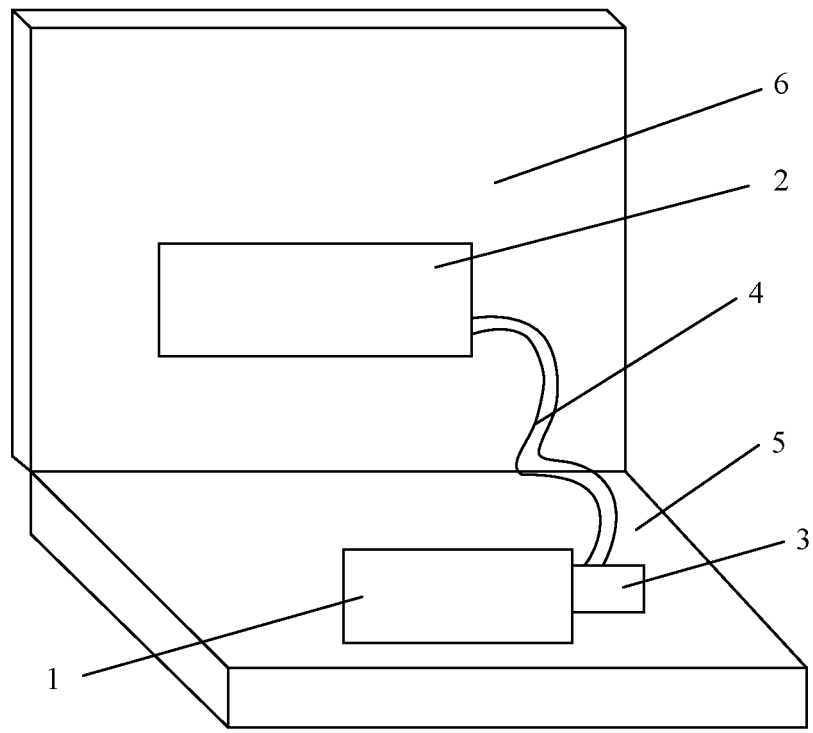
FIG. 1 is a schematic diagram of an application scenario of a heat dissipation system according to an embodiment of this application.

1: first heat dissipation panel; 101: first interface; 102: second interface; 103: first adapter; 1031: first connector;
104: second adapter; 1041: second connector; 2: second heat dissipation panel; 201: third interface; 2011: second clamping part;
202: fourth interface; 203: third adapter; 203a: fastening part; 203b: bending part; 2031: third connector;
204: fourth adapter; 2041: fourth connector; 3: driving apparatus; 301: liquid inlet; 302: liquid outlet;
4: connecting pipeline; 5: first housing; 6: second housing; 56: rotating shaft accommodating space; 7: first rotating shaft assembly;
701: first rotating shaft; 7011: first sleeve; 7012: first connecting part; 702: second rotating shaft; 7021: fifth interface;

7022: sixth interface; 70221: first clamping part; 8: second rotating shaft assembly; 801: third rotating shaft; 8011: second sleeve;

8012: second connecting part; 802: fourth rotating shaft; 8021: seventh interface; 8022: eighth interface; 9: first hose;

901: first end; 902: second end; 10a, 10b, 10c, 10d, 10e, 10f, 10g, and 10h: metal crimping ring;

11: second hose; 1101: first end; 1102: second end; 12: third hose; 1201: first end; 1202; second end;

13: fourth hose; 1301: first end; 1302: second end; 14a, 14b, 14c, and 14d: sealing ring; 15: nested mechanical part;

16: first connection assembly; 1601: first connecting piece; 16011: ninth interface; 16012: tenth interface;

1602: second connecting piece; 16021: eleventh interface; 16022: twelfth interface; 1603: first connecting pipe;

17: second connection assembly; 1701: third connecting piece; 17011: thirteenth interface; 17012: fourteenth interface;

1702: fourth connecting piece; 17021: fifteenth interface; 17022: sixteenth interface; 1703: second connecting pipe;

18: seventh hose; 19: eighth hose; 20: rotating shaft housing; and 21: ninth hose.

DESCRIPTION OF EMBODIMENTS

To make the objectives, technical solutions, and advantages of this application clearer, the following further describes this application in detail with reference to the accompanying drawings.

First, an application scenario of a heat dissipation system provided in this application is described. The heat dissipation system provided in this application may be applied to a foldable electronic device. For example, the heat dissipation system may be applied to a laptop, a wearable device, a mobile phone, a personal digital assistant (personal digital assistant, PDA), a tablet computer, or the like.

With current rapid development of electronic devices, there are increasingly more high power devices in the electronic devices. As a result, power consumption per unit area of the electronic devices increases, and a heat dissipation requirement of the electronic devices increases. Currently, a large proportion of the electronic devices, especially portable electronic devices, use a passive heat dissipation component with high heat conductivity, for example, a heat pipe, a phase change film, or a graphite film, to diffuse heat to a larger heat dissipation area, and the electronic devices dissipate heat for the electronic devices through natural heat dissipation.

However, high power-consuming devices are usually centrally disposed in a housing on one side of a foldable electronic device. Because the heat pipe cannot be folded, the heat pipe cannot be disposed across a hinge of the foldable electronic device. Therefore, heat generated by a high power device cannot be diffused to a housing on the other side through the heat pipe across the hinge. In addition, although the phase change film and the graphite film can be disposed across the hinge, heat dissipated by the phase change film and the graphite film is little. Therefore, the phase change film and the graphite film fail to meet a heat dissipation requirement of the electronic device. In addition, a temperature of a housing that is on one side of the electronic device and that is used for disposing a high power device is excessively high.

To improve heat dissipation performance of the electronic device, a heat dissipation system using a liquid cooling technology begins to emerge. In a liquid cooling heat dissipation technology, a driving apparatus may be used to circulate a liquid medium in a heat dissipation channel for heat dissipation. Because a heat dissipation system using the liquid cooling heat dissipation technology has advantages such as balanced heat and low noise, the heat dissipation system is increasingly applied to electronic devices, to dissipate heat for the electronic devices.

In this application, a specific disposing manner of the heat dissipation system using the liquid cooling technology in the electronic device is described by using a laptop as an example. FIG. 1 is a schematic diagram of an application scenario of a heat dissipation system according to an embodiment of this application. In this embodiment, the heat dissipation system may include a first heat dissipation panel 1, a second heat dissipation panel 2, a driving apparatus 3, and a connecting pipeline 4. The first heat dissipation panel 1 and the second heat dissipation panel 2 may be in communication through the connecting pipeline 4, and the connecting pipeline 4 may be filled with a liquid medium. The driving apparatus 3 may be, for example, a pump that enables a liquid medium to circularly flow between the first heat dissipation panel 1 and the second heat dissipation panel 2.

A foldable electronic device may usually include a first housing 5, a second housing 6, and a rotating shaft assembly (not shown in the figure). The first housing 5 and the second housing 6 may be separately disposed on two sides of the rotating shaft assembly, and are separately rotatably connected to the rotating shaft assembly. In a possible embodiment of this application, the first heat dissipation panel 1 may be disposed in the first housing 5, and the second heat dissipation panel 2 may be disposed in the second housing 6. In this case, when a liquid medium flows between the first heat dissipation panel 1 and the second heat dissipation panel 2, heat of the first housing 5 and the second housing 6 may be balanced. However, heat dissipation areas of the two housings are large, so that heat dissipation performance of the entire electronic device may be effectively improved.

Figure 2:
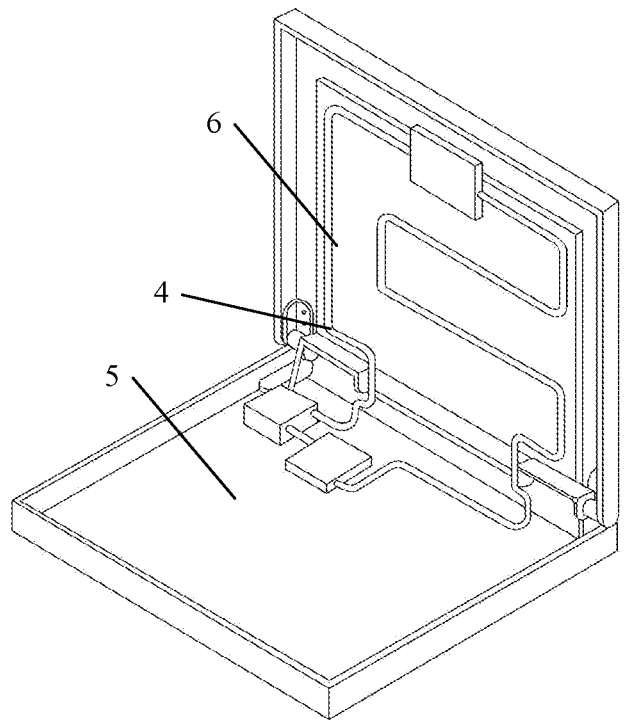
FIG. 2 is a schematic diagram of a structure of an electronic device to which a conventional heat dissipation system is applied according to this application.

However, since the first housing 5 and the second housing 6 of the foldable electronic device can rotate around a rotating shaft, a flexible bendable pipeline is usually used in a part that is of the connecting pipeline 4 and that is located on the rotating shaft, to allow a liquid medium to circulate between the two housings. FIG. 2 shows an electronic device using a conventional heat dissipation system. As shown in FIG. 2, in an application scenario with a small bending radius, when a flexible pipeline located at a rotating shaft part is bent, a pipe wall easily collapses, resulting in a sharp change in a cross-sectional area or even a complete blockage. This may block flowing of a liquid medium in the flexible pipeline located at the rotating shaft part, and lead to a large increase in system pressure and a large decrease in a flow volume. As a result, a heat dissipation capability is reduced, and even a pump is damaged. In addition, fatigue crack is prone to occur on the flexible pipeline during a long-term use of the flexible pipeline, and a risk of liquid medium leakage is high. Moreover, this solution requires large rotating shaft space. However, it is extremely difficult for a light and thin device, especially in a compact rotating shaft design, to have the large rotating shaft space, and a structure of a liquid-permeable pipe and a compact and beautiful curve design of the housing are hardly compatible.

The heat dissipation system provided in this application aims to resolve the foregoing problems, to prolong a service life of the heat dissipation system, improve heat exchange performance of the heat dissipation system. In this way, heat dissipation performance of an electronic device to which the heat dissipation system is applied is improved, the heat dissipation system is compatible with a compact mechanical rotating shaft design, and the heat dissipation system has little or no impact on an appearance design of a rotating shaft region. To understand the heat dissipation system provided in embodiments of this application, the following describes in detail a specific disposing manner of the heat dissipation system with reference to the accompanying drawings.

It should be noted that terms used in the following embodiments are merely intended to describe specific embodiments, but are not intended to limit this application. The terms "one", "a", "the foregoing", and "this" of singular forms used in this specification and the appended claims of this application are also intended to include expressions such as "one or more", unless otherwise specified in the context clearly. It should be further understood that in the following embodiments of this application, "at least one" and "one or more" refer to one, two, or more. The term "and/or" is used to describe an association relationship between associated objects and represents that three relationships may exist. For example, A and/or B may represent the following cases: Only A exists, both A and B exist, and only B exists, where A and B each may be singular or plural. The character "/" generally indicates an "or" relationship between the associated objects.

Reference to "an embodiment". "some embodiments", or the like described in this specification indicates that one or more embodiments of this application include a specific feature, structure, or characteristic described with reference to embodiments. Therefore, in this specification, statements, such as "in an embodiment", "in some embodiments", "in some other embodiments", and "in other embodiments", that appear at different places in this specification do not necessarily mean referring to a same embodiment, instead, the statements mean referring to "one or more but not all of the embodiments", unless otherwise specifically emphasized in another manner. The terms "include". "contain", "have", and their variants all mean "include but is not limited to", unless otherwise specifically emphasized in another manner.

Figure 3:
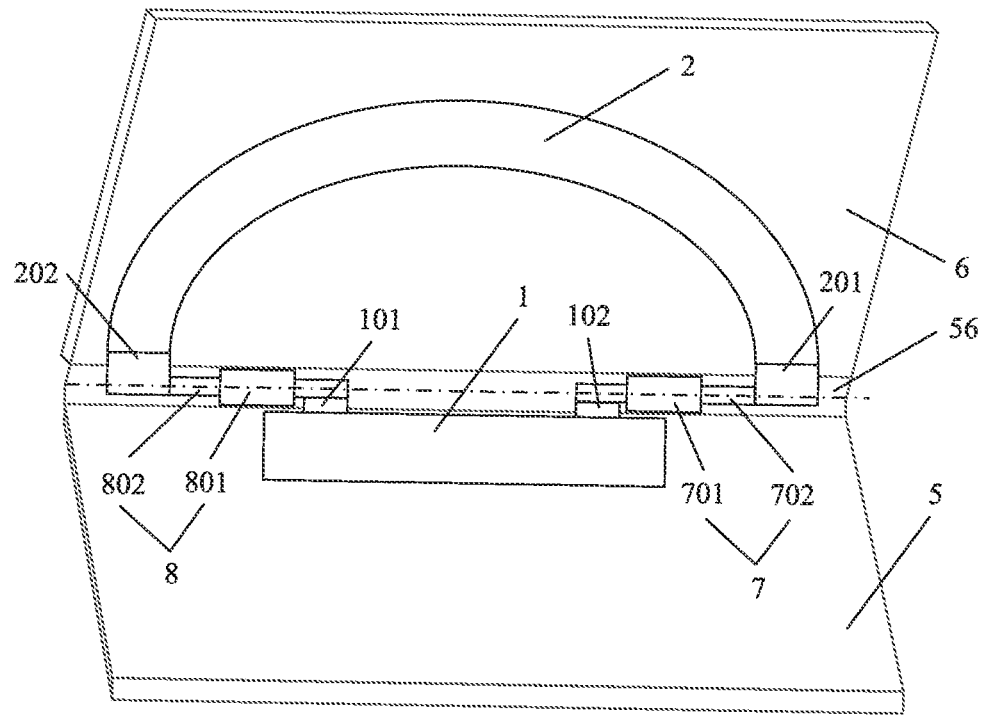
FIG. 3 is a schematic diagram of an application scenario of a heat dissipation system according to another embodiment of this application.

First, refer to FIG. 3. FIG. 3 is a schematic diagram of an application scenario of a heat dissipation system according to an embodiment of this application. It can be learned from the foregoing description of the application scenario of the heat dissipation system provided in this application that the heat dissipation system may be used in a foldable electronic device. In this application, a specific disposing manner of the heat dissipation system in the foldable electronic device is described by using an example in which the electronic device is a laptop.

Still refer to FIG. 3. The laptop may include a first housing 5, a second housing 6, and a rotating shaft assembly. The first housing 5 and the second housing 6 are separately disposed on two sides of the rotating shaft assembly, and can separately rotate around the rotating shaft assembly. It may be understood that rotating shaft accommodating space 56 may be provided between the first housing 5 and the second housing 6, and the rotating shaft accommodating space 56 is used to accommodate the rotating shaft assembly.

Still refer to FIG. 3. In this application, the heat dissipation system may include a first heat dissipation panel 1, a second heat dissipation panel 2, a first rotating shaft assembly 7, and a second rotating shaft assembly 8. The first heat dissipation panel 1 may be disposed in the first housing 5, the second heat dissipation panel 2 may be disposed in the second housing 6, and at least a part of the first rotating shaft assembly 7 and the second rotating shaft assembly 8 may be disposed in the rotating shaft accommodating space 56.

When the heat dissipation system is specifically disposed, the first heat dissipation panel 1 may include a first liquid channel (not shown in the figure), the first liquid channel includes a first interface 101 and a second interface 102, and the first interface 101 and the second interface 102 may be set to, but are not limited to, pagoda connectors. The second heat dissipation panel 2 may include a second liquid channel (not shown in the figure), the second liquid channel includes a third interface 201 and a fourth interface 202, and the third interface 201 and the fourth interface 202 may be set to, but are not limited to, pagoda connectors. The first interface 101 is in communication with the fourth interface 202 through the second rotating shaft assembly 8, and the second interface 102 is in communication with the third interface 201 through the first rotating shaft assembly 7. Therefore, the first liquid channel of the first heat dissipation panel 1 is in communication with the second liquid channel of the second heat dissipation panel 2 through the first rotating shaft assembly 7 and the second rotating shaft assembly 8.

In this way, a liquid medium in the first liquid channel of the first heat dissipation panel 1 located in the first housing 5 may enter, through the first rotating shaft assembly 7, the second liquid channel of the second heat dissipation panel 2 located in the second housing 6, and a liquid medium in the second liquid channel may further return to the first liquid channel through the second rotating shaft assembly 8. This implements circularly flowing of the liquid medium between the first liquid channel and the second liquid channel. In this way, after heat generated on a first housing 5 side is absorbed by the first heat dissipation panel 1, the heat is transferred to the second heat dissipation panel 2 on a second housing 6 side by the liquid medium across the rotating shaft accommodating space 56 in a process of circularly flowing of the liquid medium, to implement a heat balance function. This helps increase a heat exchange area between the heat dissipation system and an external environment, and further improves heat dissipation performance of the heat dissipation system.

It should be noted that, in this application, the liquid medium may be, but is not limited to, deionized water, ethylene glycol, glycol solution, fluorinated liquid, or another common liquid cooling fluid medium.

It may be understood that not all components (for example, a power source that drives a liquid medium to flow) in the heat dissipation system are shown in FIG. 3, and only a principle that a liquid medium circularly flows between the first heat dissipation panel 1, the second heat dissipation panel 2, the first rotating shaft assembly 7, and the second rotating shaft assembly 8 is described in FIG. 3. In addition, the foregoing connection relationship between the first heat dissipation panel 1, the second heat dissipation panel 2, the first rotating shaft assembly 7, and the second rotating shaft assembly 8 is merely an example of description provided in this application. In some other embodiments of this application, the foregoing structures may be further connected in another possible manner provided that a liquid medium can circularly flow between the first heat dissipation panel 1 and the second heat dissipation panel 2. For example, the first interface 101 and the fourth interface 202 are connected through the first rotating shaft assembly 7, and the second interface 102 and the third interface 201 are connected through the second rotating shaft assembly 8.

Figure 4:
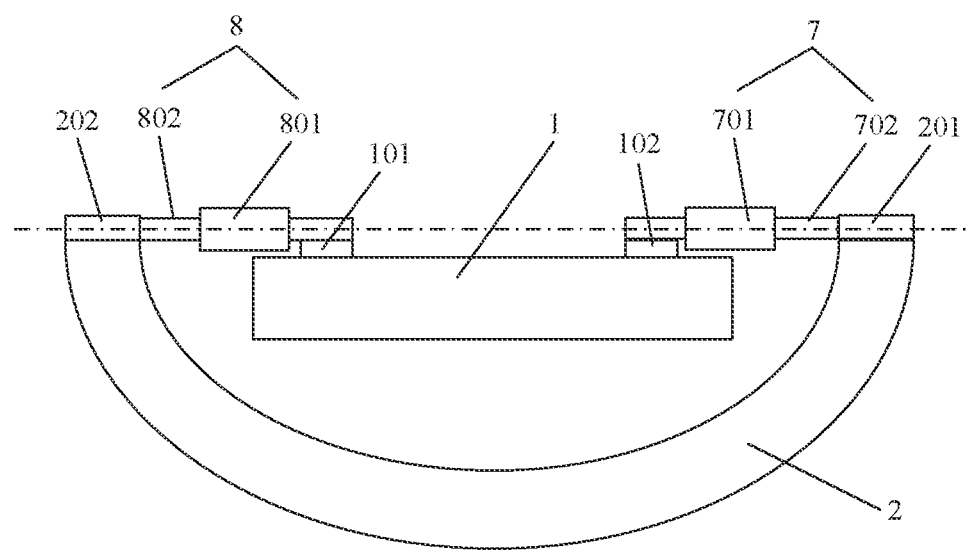
FIG. 4 is a schematic diagram of a structure of a heat dissipation system according to an embodiment of this application.

In some embodiments of this application, the first rotating shaft assembly 7 and the second rotating shaft assembly 8 may be coaxially disposed. For example, refer to FIG. 4. FIG. 4 is a schematic diagram of a structure of a heat dissipation system according to an embodiment of this application. Refer to FIG. 3 and FIG. 4. It may be understood that, in the embodiment shown in FIG. 4, the laptop may be in a closed state. Because the first heat dissipation panel 1 can rotate around the first rotating shaft assembly 7 and the second rotating shaft assembly 8, and the second heat dissipation panel 2 can rotate around the first rotating shaft assembly 7 and the second rotating shaft assembly 8, coaxial disposing of the first rotating shaft assembly 7 and the second rotating shaft assembly 8 can provide stable support for relative rotation of the first housing 5 and the second housing 6. Therefore, stability of movement of the first heat dissipation panel 1 and the second heat dissipation panel 2 is improved.

It can be learned from the foregoing description of the heat dissipation system that, in this application, the first rotating shaft assembly 7 and the second rotating shaft assembly 8 may be used as a connecting channel between the first liquid channel and the second liquid channel, and may further be used for rotation of the first heat dissipation panel 1 and the second heat dissipation panel 2. In a possible embodiment of this application, when the first rotating shaft assembly 7 is specifically disposed, the first rotating shaft assembly 7 may include a first rotating shaft 701 and a second rotating shaft 702, the first rotating shaft 701 is sleeved on the second rotating shaft 702, and the first rotating shaft 701 is rotatably connected to the second rotating shaft 702. In addition, the second rotating shaft 702 may be of a hollow structure, so that a liquid medium can flow in the second rotating shaft 702.

Similarly, the second rotating shaft assembly 8 may include a third rotating shaft 801 and a fourth rotating shaft 802, the third rotating shaft 801 is sleeved on the fourth rotating shaft 802, and the third rotating shaft 801 is rotatably connected to the fourth rotating shaft 802. In addition, the fourth rotating shaft 802 may be of a hollow structure, so that a liquid medium can flow in the fourth rotating shaft 802.

It may be understood that, in this application, the first rotating shaft 701 and the second rotating shaft 702 may be made of a same material or different materials. Because the first rotating shaft 701 is sleeved on the second rotating shaft 702, the first rotating shaft 701 can support rotation of the first heat dissipation panel 1 and the second heat dissipation panel 2, and the second rotating shaft 702 is mainly used as a circulation pipe of a liquid medium. In addition, when the second rotating shaft 702 has high structural strength, the second rotating shaft 702 may also support the first heat dissipation panel 1 and the second heat dissipation panel 2.

In addition, the third rotating shaft 801 and the fourth rotating shaft 802 may be made of a same material or different materials. Because the third rotating shaft 801 is sleeved on the fourth rotating shaft 802, the third rotating shaft 801 can support rotation of the first heat dissipation panel 1 and the second heat dissipation panel 2, and the fourth rotating shaft 802 is mainly used as a circulation pipe of a liquid medium. In addition, when the fourth rotating shaft 802 has high structural strength, the fourth rotating shaft 802 may also support the first heat dissipation panel 1 and the second heat dissipation panel 2.

Still refer to 4. In this application, when the first rotating shaft assembly 7 and the second rotating shaft assembly 8 are connected to the first heat dissipation panel 1 and the second heat dissipation panel 2, the first rotating shaft 701 and the third rotating shaft 801 may be located between the third interface 201 and the fourth interface 202. In this way, a design of an original rotating shaft structure is not affected, and implementation of the solution is simple.

Figure 5:
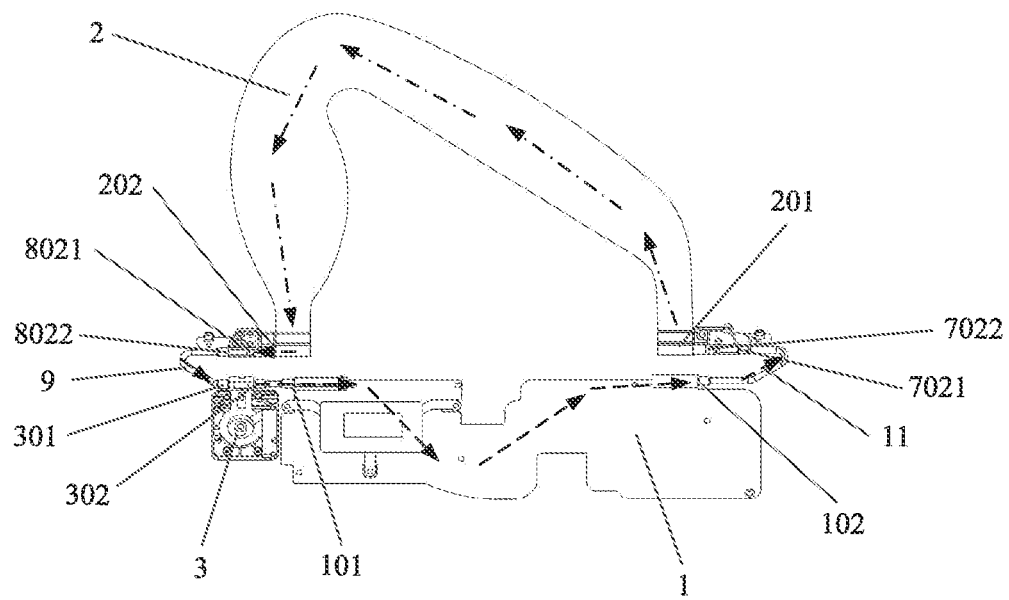
FIG. 5 is a schematic diagram of a structure of a heat dissipation system according to another embodiment of this application.
Figure 6:
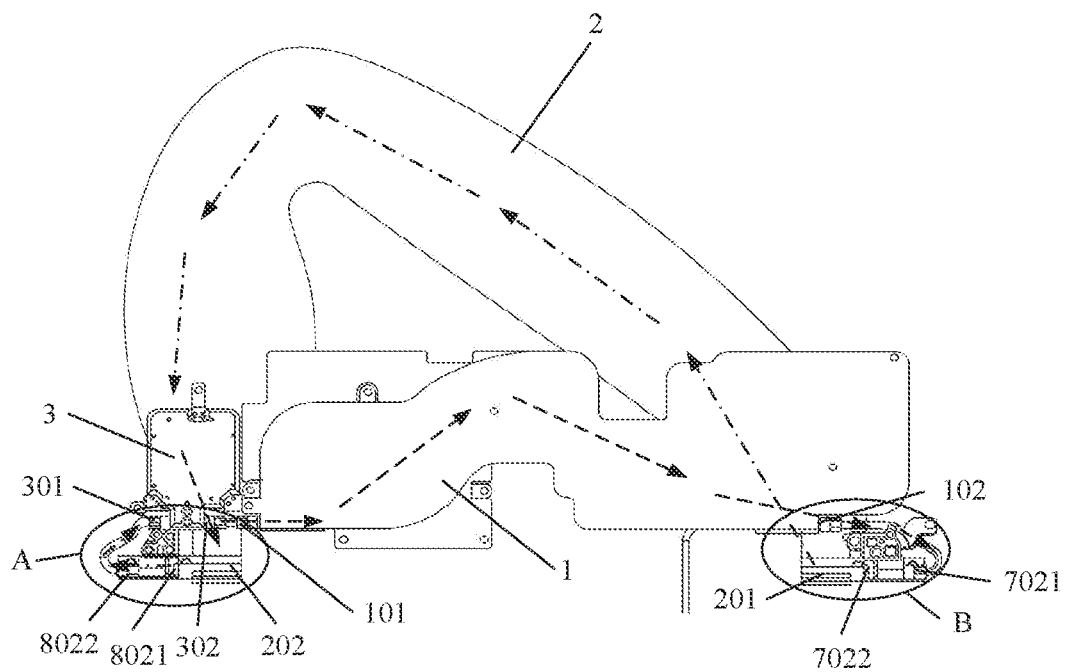
FIG. 6 is a schematic diagram of a structure of a heat dissipation system according to another embodiment of this application.

FIG. 5 is a schematic diagram of a structure of a possible heat dissipation system provided based on the embodiment in FIG. 4 in this application. FIG. 5 shows a location relationship between the first heat dissipation panel 1 and the second heat dissipation panel 2 when the electronic device is in an expanded state. It can be learned from the foregoing description that the first heat dissipation panel 1 and the second heat dissipation panel 2 are separately disposed on two housings of the electronic device, and the first heat dissipation panel 1 and the second heat dissipation panel 2 may rotate relative to each other along with the two housings. Therefore, the first heat dissipation panel 1 and the second heat dissipation panel 2 can be folded from an unfolded state shown in FIG. 5. In addition, refer to FIG. 6. FIG. 6 shows a location relationship between the first heat dissipation panel 1 and the second heat dissipation panel 2 when the electronic device is in a closed state. In this embodiment of this application, to implement circularly flowing of a liquid medium between the first heat dissipation panel 1 and the second heat dissipation panel 2, the heat dissipation system may further be provided with a driving apparatus 3. The driving apparatus 3 may be, but is not limited to, a pump. The driving apparatus 3 serves as a power source for flowing of the liquid medium, and may be disposed between the first heat dissipation panel 1 and the second heat dissipation panel 2. For example, in the embodiment shown in FIG. 5, the driving apparatus 3 is disposed between the first interface 101 and the fourth interface 202. In some other embodiments, the driving apparatus 3 may be further disposed between the second interface 102 and the third interface 201.

In a possible embodiment of this application, to enable the first heat dissipation panel 1, the second heat dissipation panel 2, the second rotating shall 702 of the first rotating shaft assembly 7, and the fourth rotating shaft 802 of the second rotating shaft assembly 8 to be in communication with the driving apparatus 3, the second rotating shaft 702 may include a fifth interface 7021 and a sixth interface 7022, where the fifth interface 7021 and the sixth interface 7022 may be set to, but are not limited to, pagoda connectors. The fourth rotating shaft 802 may include a seventh interface 8021 and an eighth interface 8022, and the seventh interface 8021 and the eighth interface 8022 may be set to, but are not limited to, pagoda connectors. In addition, the driving apparatus 3 may include a liquid inlet 301 and a liquid outlet 302.

Refer to FIG. 5. The liquid outlet 302 may be connected to the first interface 101, the second interface 102 may be connected to the fifth interface 7021, the sixth interface 7022 may be connected to the third interface 201, the fourth interface 202 may be connected to the seventh interface 8021, and the eighth interface 8022 may be connected to the liquid inlet 301. This implements communication between the first liquid channel, the second liquid channel, the second rotating shaft 702, the fourth rotating shaft 802, and the driving apparatus 3, and forms a liquid medium circulation channel of the heat dissipation system.

In FIG. 5, a flow direction of the liquid medium in the heat dissipation system is indicated by arrows. In specific implementation, a dotted line with an arrow indicates flowing of a liquid medium between the driving apparatus 3 and the first heat dissipation panel 1, and under an action of driving force of the driving apparatus 3, the liquid medium flows out from the liquid outlet 302 of the driving apparatus 3, and enters the first liquid channel through the first interface 101.

After flowing through the first heat dissipation panel 1, the liquid medium flows out from the second interface 102, and enters the second rotating shaft 702 through the fifth interface 7021. Then, after flowing through the first rotating shaft assembly 7, the liquid medium flows out from the sixth interface 7022, and enters the second liquid channel through the third interface 201. In FIG. 5, a dash-single dot line with an arrow indicates flowing of a liquid medium in the second heat dissipation panel 2. After flowing through the second heat dissipation panel 2, the liquid medium flows out from the fourth interface 202, and enters the fourth rotating shaft 802 through the seventh interface 8021. Finally, after flowing through the second rotating shaft assembly 8, the liquid medium flows out from the eighth interface 8022, and enters the driving apparatus 3 through the liquid inlet 301. At this point, one time of circulation of the liquid medium in the heat dissipation system is completed.

It may be understood that FIG. 5 is merely an example of a connection manner between parts of the heat dissipation system in a possible embodiment of this application. In some other embodiments of this application, some connected interfaces may alternatively be exchanged provided that a liquid medium can circulate between the first heat dissipation panel 1, the second heat dissipation panel 2, the first rotating shaft assembly 7, the second rotating shaft assembly 8, and the driving apparatus 3. For example, the liquid outlet 302 may be connected to the eighth interface 8022, and the liquid inlet 301 may be connected to the first interface 101.

In addition, FIG. 5 merely shows a flow direction of the liquid medium in a possible embodiment of this application. In some other embodiments of this application, the liquid medium may alternatively flow in a direction opposite to that in FIG. 5. This is not specifically limited in this application.

According to the heat dissipation system provided in this application, in a process in which a liquid medium circulates in the heat dissipation system, heat generated by the first housing of the electronic device may be transferred to the second housing across the rotating shaft. This helps increase an area in which the heat dissipation system exchanges heat with an external environment, so that a heat dissipation area of the electronic device is multiplied. Therefore, heat dissipation performance of the electronic device is improved.

Figure 7:
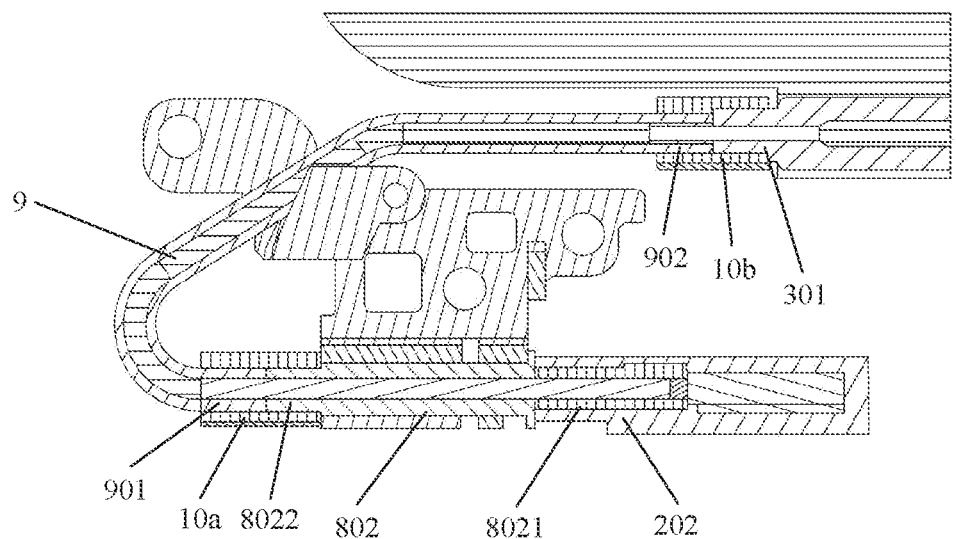
FIG. 7 is an enlarged view of a partial structure at A in FIG. 6.

Further refer to FIG. 7. FIG. 7 is a cross-sectional view of a partial structure at A of the heat dissipation system shown in FIG. 6. To improve structural reliability of the heat dissipation system, the eighth interface 8022 of the fourth rotating shaft 802 may be connected to the liquid inlet 301 of the driving apparatus 3 through a first hose 9. The first hose 9 may deform when the first heat dissipation panel 1 and the second heat dissipation panel 2 rotate relative to each other, to reduce a risk of liquid leakage in the heat dissipation system.

In addition, still refer to FIG. 7. A first end 901 of the first hose 9 may be connected to the eighth interface 8022, and the first end 901 may be crimped with and fastened to the eighth interface 8022 through a metal crimping ring 10*a*. In this case, the metal crimping ring 10*a* is sleeved on the first end 901 of the first hose 9 and the eighth interface 8022, and the first end 901 and the eighth interface 8022 are tightly pressed. In this way, a sealed connection is implemented between the first hose 9 and the eighth interface 8022. Similarly, in some embodiments of this application, a second end 902 of the first hose 9 may be connected to the liquid inlet 301, and the second end 902 may be crimped with the liquid inlet 301 through a metal crimping ring 10*b*. In this way, a sealed connection between the first hose 9 and the liquid inlet 301 is implemented, to reduce a risk of liquid leakage at the eighth interface 8022 and the liquid inlet 301.

Refer to FIG. 7. In a possible embodiment of this application, the seventh interface 8021 of the fourth rotating shaft 802 may be nested in the fourth interface 202 of the second liquid channel, where a diameter of the seventh interface 8021 is less than a diameter of the fourth interface 202. In this embodiment, the seventh interface 8021 may be fixedly connected to the fourth interface 202 through, but is not limited to, riveting, welding, or the like. It may be understood that, after the seventh interface 8021 is fixedly connected to the fourth interface 202, a sealing structure may be formed between the seventh interface 8021 and the fourth interface 202, so that a risk of liquid leakage at the seventh interface 8021 and the fourth interface 202 may be reduced.

Figure 8:
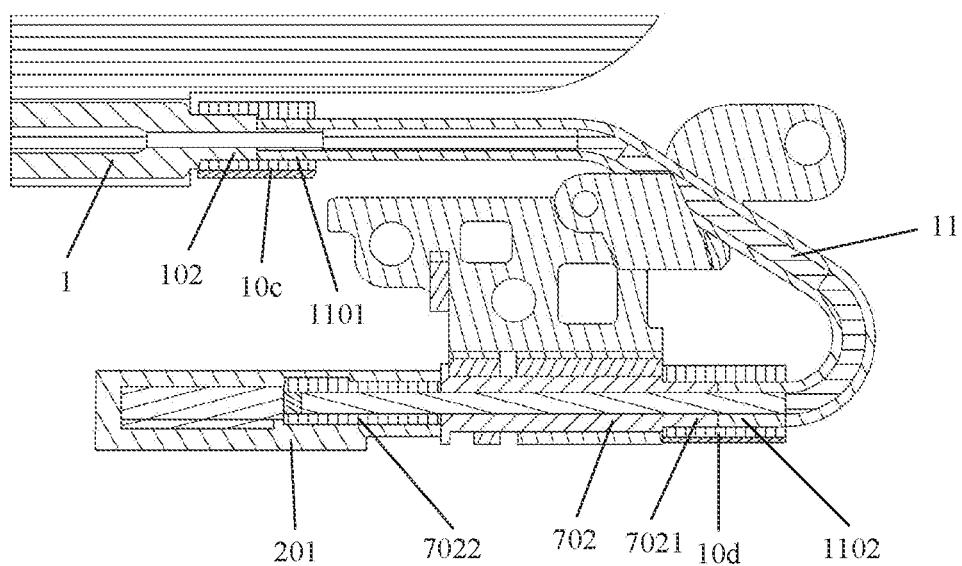
FIG. 8 is an enlarged view of a partial structure at B in FIG. 6.

FIG. 8 is a schematic diagram of a structure of a partial structure at B of the heat dissipation system shown in FIG. 6. In the embodiment shown in FIG. 8, the second interface 102 of the first liquid channel and the fifth interface 7021 of the second rotating shaft 702 may be connected through a second hose 11, and the second hose 11 may deform when the first heat dissipation panel 1 and the second heat dissipation panel 2 rotate relative to each other, to reduce a risk of liquid leakage in the heat dissipation system.

In addition, still refer to FIG. 8. A first end 1101 of the second hose 11 may be connected to the second interface 102, and the first end 1101 of the second hose 11 may be crimped with the second interface 102 through a metal crimping ring 10*c*. In this way, a sealed connection is implemented between the second hose 11 and the second interface 102. Similarly, in some embodiments of this application, a second end 1102 of the second hose 11 may be connected to the fifth interface 7021, and the second end 1102 may be crimped with the fifth interface 7021 through a metal crimping ring 10*d*. In this way, a sealed connection between the second hose 11 and the fifth interface 7021 is implemented, to reduce a risk of liquid leakage at the second interface 102 and the fifth interface 7021.

Still refer to FIG. 8. The sixth interface 7022 of the second rotating shaft 702 may be nested in the third interface 201 of the second liquid channel, where a diameter of the sixth interface 7022 is less than a diameter of the third interface 201. In this embodiment, the sixth interface 7022 may be fixedly connected to the third interface 201 through, but is not limited to, riveting, welding, or the like. It may be understood that, after the sixth interface 7022 is fixedly connected to the third interface 201, a sealing structure may be formed between the sixth interface 7022 and the third interface 201, so that a risk of liquid leakage at the sixth interface 7022 and the third interface 201 may be reduced.

Figure 9:
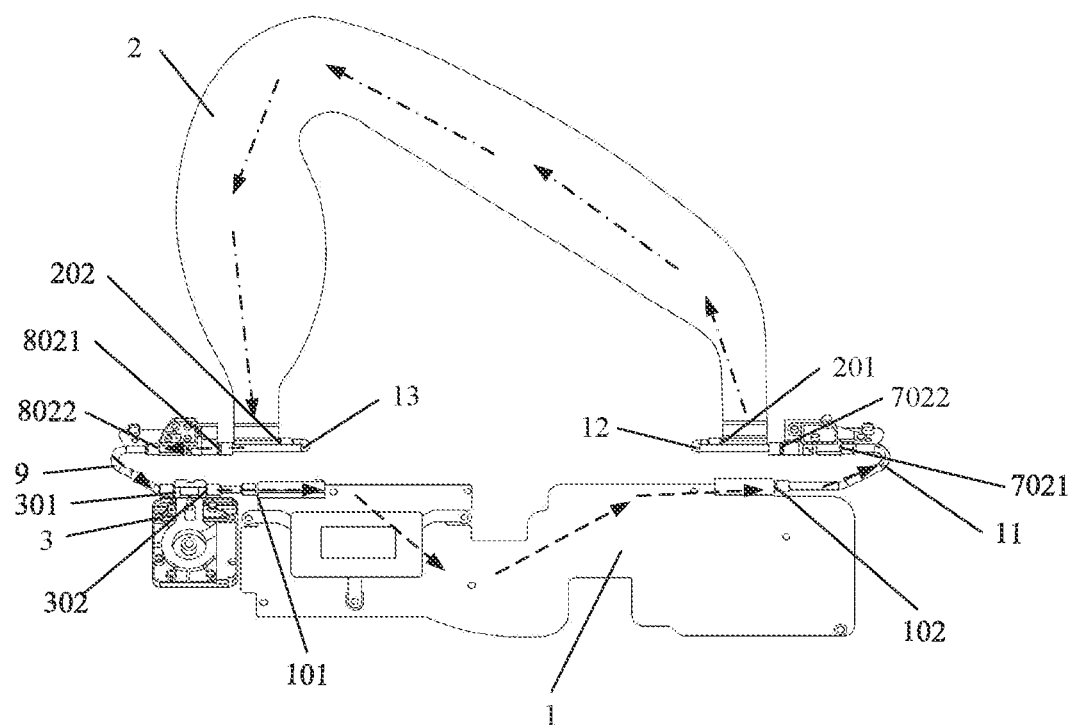
FIG. 9 is a schematic diagram of a structure of a heat dissipation system according to another embodiment of this application.
Figure 10:
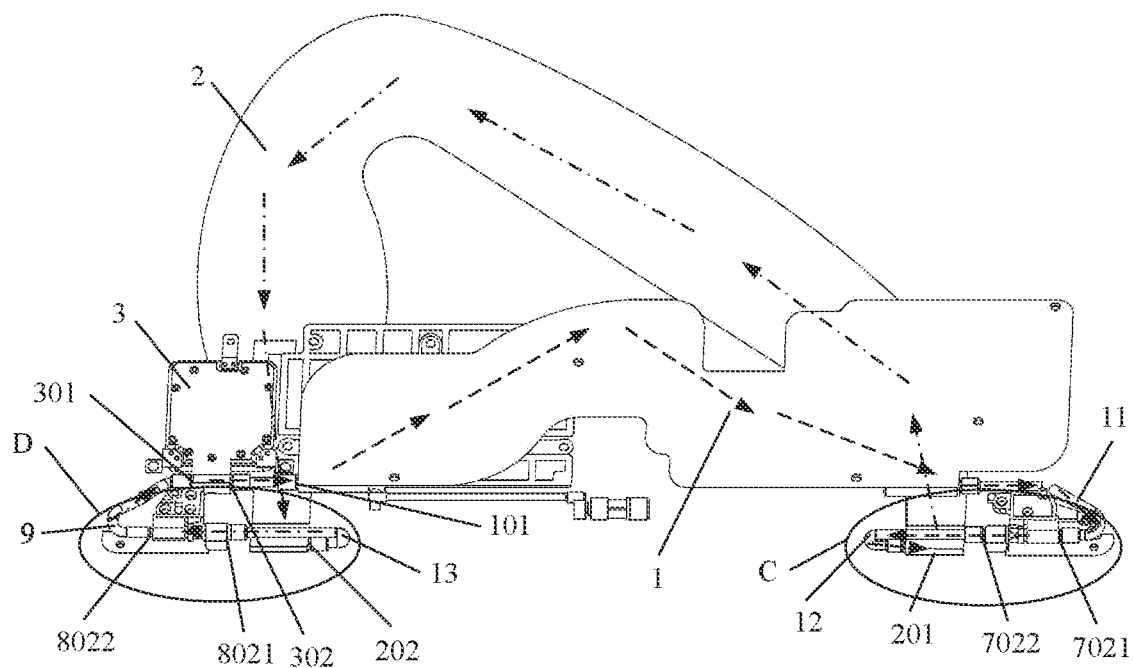
FIG. 10 is a schematic diagram of a structure of a heat dissipation system according to another embodiment of this application.

FIG. 9 is a schematic diagram of a structure of a heat dissipation system according to another embodiment of this application. FIG. 9 shows a relative location relationship between the first heat dissipation panel 1 and the second heat dissipation panel 2 when the electronic device is in an expanded state. It can be learned from the foregoing description that the first heat dissipation panel 1 and the second heat dissipation panel 2 are separately disposed on two housings of the electronic device, and the first heat dissipation panel 1 and the second heat dissipation panel 2 may rotate relative to each other along with the two housings. Therefore, the first heat dissipation panel 1 and the second heat dissipation panel 2 can be folded from an unfolded state shown in FIG. 9. FIG. 10 shows a relative location relationship between the first heat dissipation panel 1 and the second heat dissipation panel 2 in the heat dissipation system when the electronic device shown in FIG. 9 is in a closed state. A difference between this embodiment and the heat dissipation system in the embodiment shown in FIG. 5 mainly lies in a connection manner between the first rotating shaft assembly 7 and the second rotating shaft assembly 8 and the second heat dissipation panel 2. Refer to FIG. 9. In this embodiment, the sixth interface 7022 of the second rotating shaft 702 and the third interface 201 of the second liquid channel may be connected through a third hose 12, and the third hose 12 may deform when the first heat dissipation panel 1 and the second heat dissipation panel 2 rotate relative to each other, to absorb a porting of twisting. Therefore, structural reliability of the heat dissipation system is improved, and a risk of liquid leakage in the heat dissipation system is reduced.

Figure 11:
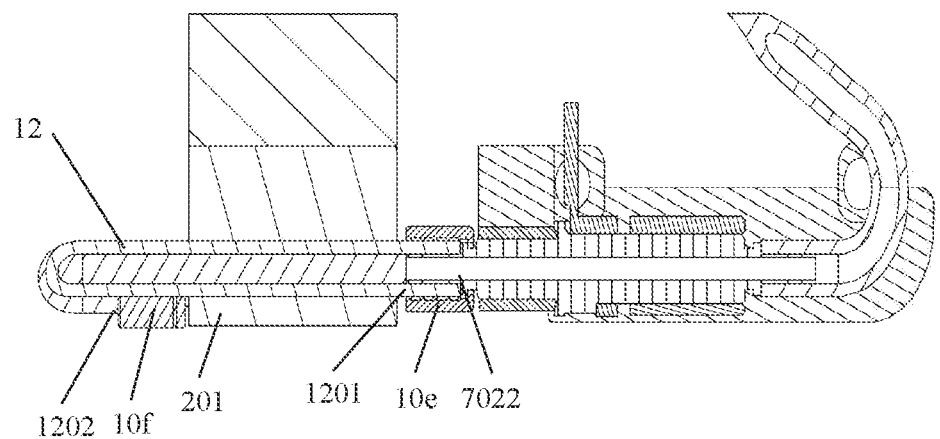
FIG. 11 is an enlarged view of a partial structure at C in FIG. 10.

Further refer to FIG. 11. FIG. 11 is an enlarged view of a cross-sectional view of a partial structure at C in FIG. 10. In this embodiment, a first end 1201 of the third hose 12 may be sleeved on the sixth interface 7022. In addition, the first end 901 may be crimped with the sixth interface 7022 through a metal crimping ring 10e. In this way, a sealed connection is implemented between the third hose 12 and the sixth interface 7022. Similarly, in some embodiments of this application, a second end 1202 of the third hose 12 may be crimped with the third interface 201 through a metal crimping ring 10f. In this way, a sealed connection is implemented between the third hose 12 and the third interface 201, to reduce a risk of liquid leakage at the sixth interface 7022 and the third interface 201 is reduced.

Figure 12:
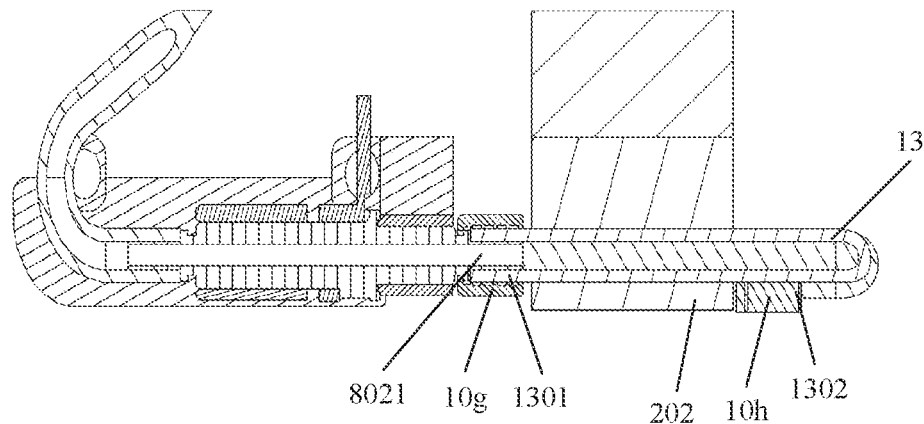
FIG. 12 is an enlarged view of a partial structure at D in FIG. 10.

Further refer to FIG. 12. FIG. 12 is an enlarged view of a cross-sectional view of a partial structure at D in FIG. 10. In this embodiment, the seventh interface 8021 of the fourth rotating shaft 802 may be connected to the fourth interface 202 of the second liquid channel through a fourth hose 13. The fourth hose 13 may deform when the first heat dissipation panel 1 and the second heat dissipation panel 2 rotate relative to each other, to absorb a portion of twisting. Therefore, structural reliability of the heat dissipation system is improved, and a risk of liquid leakage in the heat dissipation system is reduced.

Still refer to FIG. 12. A first end 1301 of the fourth hose 13 may be sleeved on the seventh interface 8021, and the first end 1301 may be crimped with the seventh interface 8021 through a metal crimping ring log. In this way, a sealed connection is implemented between the fourth hose 13 and the seventh interface 8021. Similarly, in some embodiments of this application, a second end 1302 of the fourth hose 13 may be sleeved on the fourth interface 202, and the second end 1302 may be crimped with the fourth interface 202 through a metal crimping ring 10h. In this way, a sealed connection is implemented between the fourth hose 13 and the fourth interface 202, to reduce a risk of liquid leakage at the seventh interface 8021 and the fourth interface 202.

Other parts of the heat dissipation system in the embodiment shown in FIG. 9 and connection relationships between the parts may be set with reference to the foregoing embodiment. Details are not described herein again. In addition, further refer to FIG. 9. In FIG. 9, an arrow indicates a flow direction of a liquid medium in the heat dissipation system. In specific implementation, a dotted line with an arrow indicates flowing of a liquid medium between the driving apparatus 3 and the first heat dissipation panel 1, and under an action of driving force of the driving apparatus 3, the liquid medium flows out from the liquid outlet 302 of the driving apparatus 3, and enters the first liquid channel through the first interface 101. After flowing through the first heat dissipation panel 1, the liquid medium flows out from the second interface 102, flows through the second hose 11, and enters the second rotating shaft 702 through the fifth interface 7021. Then, after flowing through the first rotating shaft assembly 7, the liquid medium flows out from the sixth interface 7022, flows through the third hose 12, and enters the second liquid channel through the third interface 201. In FIG. 9, a dash-single dot line with an arrow indicates flowing of a liquid medium in the second heat dissipation panel 2. After flowing through the second heat dissipation panel 2, the liquid medium flows out from the fourth interface 202, flows through the fourth hose 13, and enters the fourth rotating shaft 802 through the seventh interface 8021. Finally, after flowing through the second rotating shaft assembly 8, the liquid medium flows out from the eighth interface 8022, flows through the first hose 9, and enters the driving apparatus 3 through the liquid inlet 301. At this point, one time of circulation of the liquid medium in the heat dissipation system is completed.

In addition. FIG. 9 merely shows a flow direction of the liquid medium in a possible embodiment of this application. In some other embodiments of this application, the liquid medium may alternatively flow in a direction opposite to that in FIG. 9. This is not specifically limited in this application.

Figure 13:
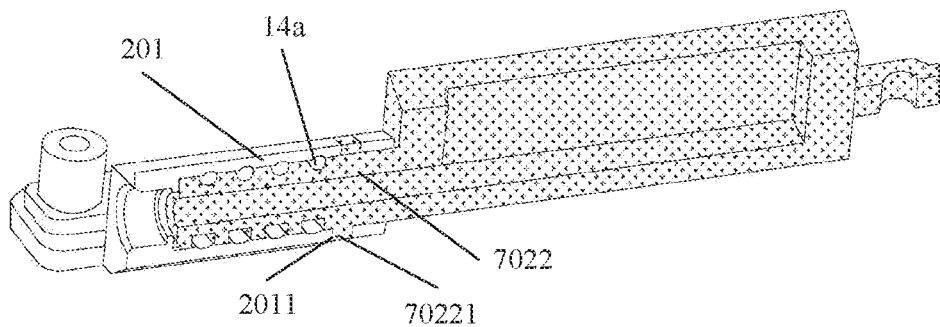
FIG. 13 is a schematic diagram of a connection structure between a sixth interface and a third interface according to an embodiment of this application.

In this application, the first rotating shaft assembly 7, the second rotating shaft assembly 8, and the second heat dissipation panel 2 may be connected in another possible manner in addition to the manner described in the foregoing embodiment. For example, refer to FIG. 13. FIG. 13 shows a cross-sectional view of a connection structure between the sixth interface 7022 and the third interface 201. In this embodiment, the sixth interface 7022 of the second rotating shaft 702 is inserted into the third interface 201 of the second liquid channel. In addition, a plurality of sealing rings 14a may be disposed between the sixth interface 7022 and the third interface 201, and the plurality of sealing rings 14a abut with an outer ring surface of the sixth interface 7022 and an inner ring surface of the third interface 201 at the same time. Therefore, sealing effect between the sixth interface 7022 and the third interface 201 may be effectively improved.

In a possible embodiment of this application, a first clamping part 70221 may be disposed on the sixth interface 7022, and a second clamping part 2011 may be disposed on the third interface 201. To implement clamping between the first clamping part 70221 and the second clamping part 2011, for example, in the embodiment shown in FIG. 13, the first clamping part 70221 may be a protrusion, the second clamping part 2011 may be a groove, and the protrusion penetrates into the groove, to implement clamping between the first clamping part 70221 and the second clamping part 2011. The first clamping part 70221 and the second clamping part 2011 that are clamped together are disposed, so that the sixth interface 7022 and the third interface 201 may be limited in an axial direction. Therefore, reliability of a connection between the sixth interface 7022 and the third interface 201 is improved.

In some embodiments of this application, the seventh interface 8021 and the fourth interface 202 may alternatively be connected in a manner shown in FIG. 13, and a specific connection thereof is not described herein again.

Figure 14:
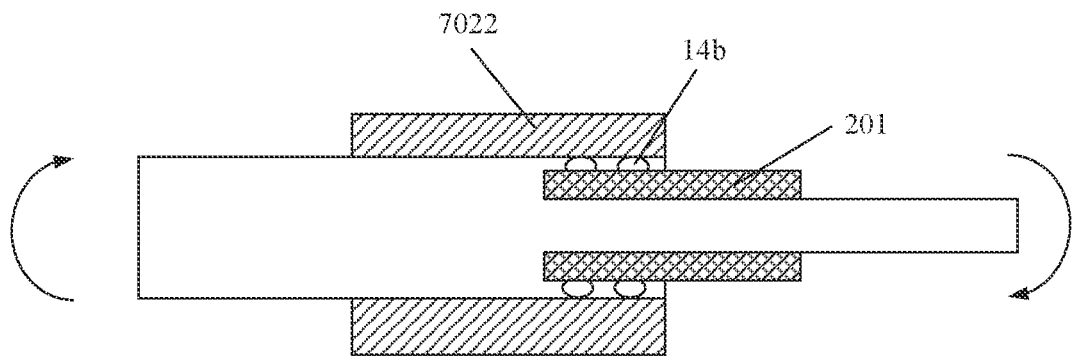
FIG. 14 is a schematic diagram of a connection structure between a sixth interface and a third interface according to another embodiment of this application.

FIG. 14 is a cross-sectional diagram of a connection structure between the sixth interface 7022 and the third interface 201 according to another possible embodiment of this application. In this embodiment, the sixth interface 7022 and the third interface 201 are connected in a nested manner, and a diameter of the sixth interface 7022 is greater than a diameter of the third interface 201. In some other embodiments, the diameter of the third interface 201 may alternatively be greater than the diameter of the sixth interface 7022.

In addition, a sealing ring 14b is disposed between the sixth interface 7022 and the third interface 201. The sealing ring 14b may be but is not limited to an O-shaped sealing ring. In addition, the sealing ring 14b may be in interference fit with the sixth interface 7022 and the third interface 201. For example, in the embodiment shown in FIG. 14, the sealing ring 14b abuts with an outer side surface of the third interface 201 and an inner side surface of the sixth interface 7022, to implement interference fit between the sealing ring 14b, the sixth interface 7022, and the third interface 201. Therefore, a risk of liquid leakage at the sixth interface 7022 and the third interface 201 is reduced.

Still refer to FIG. 14. In a possible embodiment of this application, the sixth interface 7022 and the third interface 201 may further rotate relative to each other, so that a portion of twisting may be absorbed w % ben the first heat dissipation panel 1 and the second heat dissipation panel 2 rotate relative to each other. Therefore, structural reliability of the heat dissipation system is improved.

Similarly, the seventh interface 8021 and the fourth interface 202 may alternatively be directly connected in the manner shown in FIG. 14, and a specific connection thereof is not described herein again.

Figure 15:
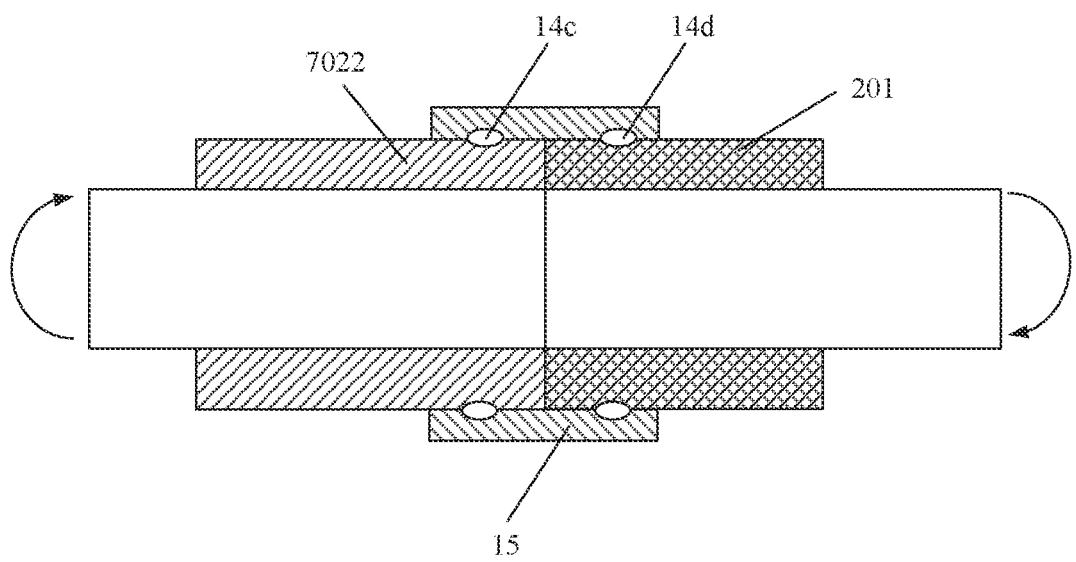
FIG. 15 is a schematic diagram of a connection structure between a sixth interface and a third interface according to another embodiment of this application.

FIG. 15 is a cross-sectional diagram of a connection structure between the sixth interface 7022 and the third interface 201 according to another embodiment of this application. In this embodiment, the sixth interface 7022 and the third interface 201 are alternatively connected through a nested structure. However, a difference between this embodiment and the embodiment shown in FIG. 14 lies in that the sixth interface 7022 and the third interface 201 are disposed to be connected through the nested mechanical part 15. During specific implementation, the sixth interface 7022 is disposed opposite to an end of the third interface 201, and the nested mechanical part 15 is sleeved at a joint between the sixth interface 7022 and the third interface 201. In addition, a sealing ring 14c is disposed between the nested mechanical part 15 and the sixth interface 7022, and the sealing ring 14c is in interference fit with the nested mechanical part 15 and the sixth interface 7022. A sealing ring 14d may be disposed between the nested mechanical part 15 and the third interface 201, and the sealing ring 14d is in interference fit with the nested mechanical part 15 and the third interface 201. Therefore, a risk of liquid leakage at the sixth interface 7022 and the third interface 201 is reduced.

In a possible embodiment of this application, an inner diameter of the sixth interface 7022 may be approximately the same as an inner diameter of the third interface 201. This improves smoothness of flowing of a liquid medium between the sixth interface 7022 and the third interface 201. In addition, an outer diameter of the sixth interface 7022 may alternatively be the same as an outer diameter of the third interface 201. This helps improve sealing effect between the sixth interface 7022 and the third interface 201 and the nested mechanical part.

Still refer to FIG. 15. In a possible embodiment of this application, the sixth interface 7022 and the third interface 201 may further rotate relative to each other, so that a portion of twisting may be absorbed when the first heat dissipation panel 1 and the second heat dissipation panel 2 rotate relative to each other. Therefore, structural reliability of the heat dissipation system is improved.

Similarly, the seventh interface 8021 and the fourth interface 202 may alternatively be directly connected in the manner shown in FIG. 15, and a specific connection thereof is not described herein again.

Because the second rotating shaft of the first rotating shaft assembly may be of a hollow structure, in some possible embodiments, based on the implementation shown in FIG. 9, the second interface 102 and the third interface 201 may be connected through a fifth hose, and the fifth hose may pass through the second rotating shaft. In addition, a first end of the fifth hose is connected to the second interface 102, and a second end of the fifth hose is connected to the third interface 201. For a specific connection manner of the fifth hose, refer to the foregoing embodiment. Details are not described herein again. In this way, a structure of the heat dissipation system may be effectively simplified. In addition, when the first heat dissipation panel 1 and the second heat dissipation panel 2 rotate relative to each other, the fifth hose may absorb a portion of twisting. Therefore, structural reliability of the heat dissipation system is improved.

Similarly, because the fourth rotating shaft of the second rotating shaft assembly is of a hollow structure, the fourth interface 202 and the liquid inlet 301 may be connected through a sixth hose. The sixth hose passes through the fourth rotating shaft, a first end of the sixth hose is connected to the fourth interface 202, and a second end is connected to the liquid inlet 301. For a specific connection manner of the sixth hose, refer to the foregoing embodiment. Details are not described herein again. In this way, a structure of the heat dissipation system may be effectively simplified. In addition, when the first heat dissipation panel 1 and the second heat dissipation panel 2 rotate relative to each other, the sixth hose may absorb a portion of twisting. Therefore, structural reliability of the heat dissipation system is improved.

Figure 16:
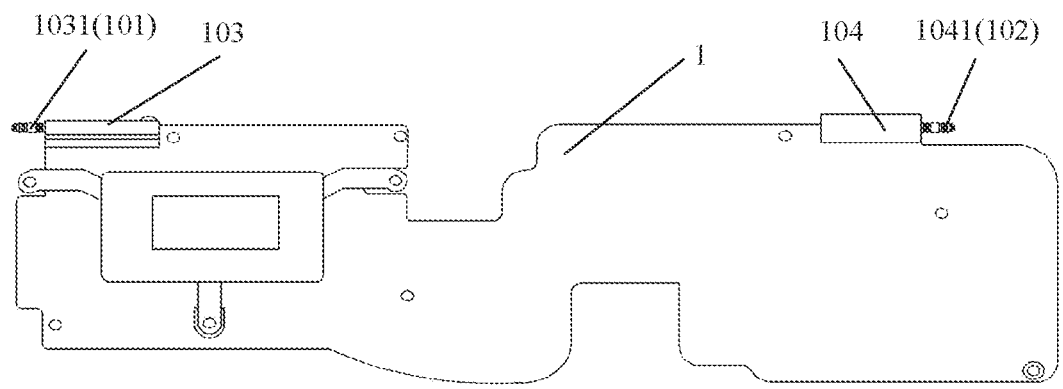
FIG. 16 is a schematic diagram of a structure of a first heat dissipation panel according to an embodiment of this application.

It may be understood that, to implement a light and thin design of the electronic device, thicknesses of the first housing 5 and the second housing 6 of the electronic device are usually set to be small. Therefore, thicknesses of the first heat dissipation panel 1 disposed in the first housing 5 and the second heat dissipation panel 2 disposed in the second housing 6 are small. The small thicknesses of the first heat dissipation panel 1 and the second heat dissipation panel 2 cause a phenomenon that a flow area is instantaneously reduced when a liquid medium flows through the first heat dissipation panel 1 and the second heat dissipation panel 2. As a result, flowing of the liquid medium is unstable. To improve smoothness of the flowing of the liquid medium when the liquid medium flows through the first heat dissipation panel 1 and the second heat dissipation panel 2, especially when the liquid medium enters the first heat dissipation panel 1 and the second heat dissipation panel 2, an adapter may be disposed on the first heat dissipation panel 1 and the second heat dissipation panel 2, to implement a connection between the first heat dissipation panel 1, the second heat dissipation panel 2, and another interface by using the adapter. During specific implementation, refer to FIG. 16. FIG. 16 is a schematic diagram of a structure of the first heat dissipation panel 1 according to an embodiment of this application. In this embodiment, the first heat dissipation panel 1 is provided with a first adapter 103, and a material of the first adapter 103 may be, but is not limited to, rigid metal, a polymer non-metal, or the like. The first adapter 103 is of a three-dimensional structure, and a shape of a cross section the first adapter 103 may be but is not limited to a regular shape such as a rectangle or a circle, or may be another possible irregular shape. In addition, the first adapter 103 is in communication with the first liquid channel, the first adapter 103 is provided with a first connector 1031, and the first connector 1031 may be used as the first interface 101 for connecting the first heat dissipation panel to another pipeline. In this application, the first connector 1031 may be but is not limited to a pagoda connector. This helps implement a connection between the first connector 1031 and another interface.

In this embodiment of this application, a cross-sectional area of the first adapter 103 may be adjusted, so that when a liquid medium enters the first heat dissipation panel through the first interface, a sudden reduction of a flow area of the liquid medium is avoided. This helps improve smoothness of flowing of the liquid medium, so that the heat dissipation system can stably dissipate heat for the electronic device.

Similarly, the first heat dissipation panel 1 may be further provided with a second adapter 104, and the second adapter 104 is in communication with the first liquid channel. The second adapter 104 may be provided with a second connector 1041, and the second connector 1041 may be used as the second interface 102 for connecting the first heat dissipation panel to another pipeline. For the second adapter 104 and a specific disposing manner of the second adapter 104, refer to the first adapter 103. Details are not described herein again.

Figure 17:
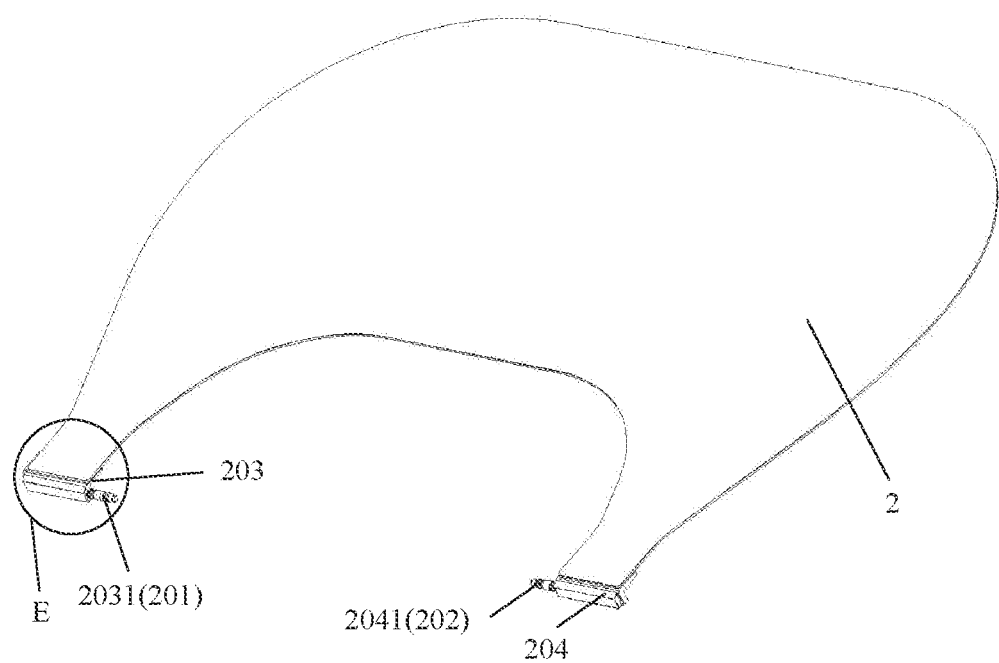
FIG. 17 is a schematic diagram of a structure of a second heat dissipation panel according to an embodiment of this application.

FIG. 17 is a schematic diagram of a structure of the second heat dissipation panel according to an embodiment of this application. In this embodiment, the second heat dissipation panel may be provided with a third adapter 203, and the third adapter 203 is in communication with the second liquid channel. The third adapter 203 may be of a three-dimensional structure. The third adapter 203 may be made of a rigid metal material, and may be an assembled structure. In this case, the third adapter 203 may include a cover plate and a body, and the cover plate may be configured to be fixedly connected to the second heat dissipation panel. In addition, the cover plate covers the body, to form a liquid medium flow channel between the cover plate and the body. In some other embodiments of this application, the third adapter 203 may alternatively be of an integrally formed structure, and may be made of a rigid metal material or a polymer non-metallic material. In addition, a third connector 2031 may be disposed on the third adapter 203, and the third connector 2031 may be but is not limited to a pagoda connector. This helps implement a connection between the third connector 2031 and another interface.

Figure 18:
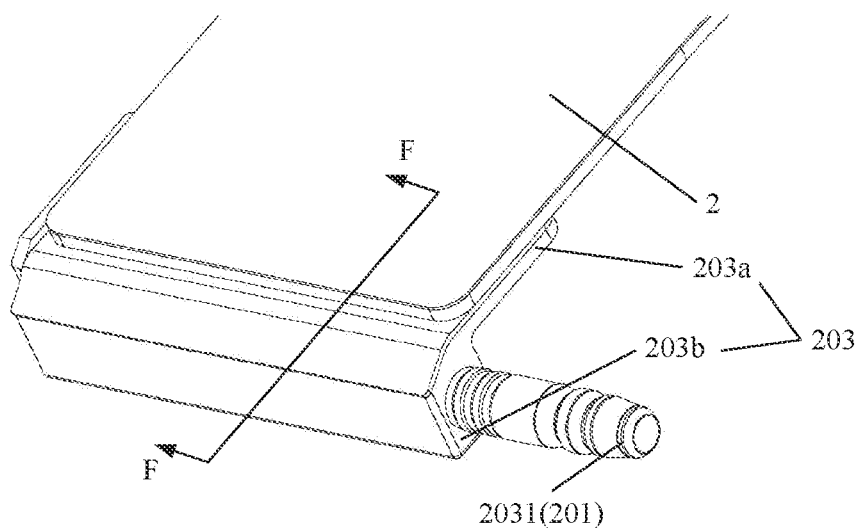
FIG. 18 is an enlarged view of a partial structure at E in FIG. 17.

Because the third interface 201 of the second heat dissipation panel 2 may be connected to the second interface 102 of the first heat dissipation panel 1 through the second rotating shaft 702 of the first rotating shaft assembly 7, in a possible embodiment of this application, the third adapter 203 may extend into the rotating shaft accommodating space 56 of the electronic device. When the third adapter 203 is specifically disposed, refer to FIG. 18. FIG. 18 is an enlarged view of a partial structure of a position E of the second heat dissipation panel shown in FIG. 17. The third adapter 203 may include a fastening part 203a and a bending part 203b, where the fastening part 203a is configured to be fixedly connected to the second heat dissipation panel 2. The third connector 2031 is disposed on the bending part 203b, and the bent part 203b is bent from the fastening part 203a toward the first heat dissipation panel. A specific bending angle of the bending part 203b may be set based on the rotating shaft accommodating space 56, to avoid interference of that bending part 203b with a structure forming the rotating shaft accommodating space 56 and a structure in the rotating shaft accommodating space 56. In addition, a bending form of the bending part 203b may be further designed based on an outline of the rotating shaft accommodating space 56, so that the bending part 203b can be used as a part of the outline of the rotating shaft accommodating space 56. Therefore, appearance of the electronic device is neater.

Figure 19:
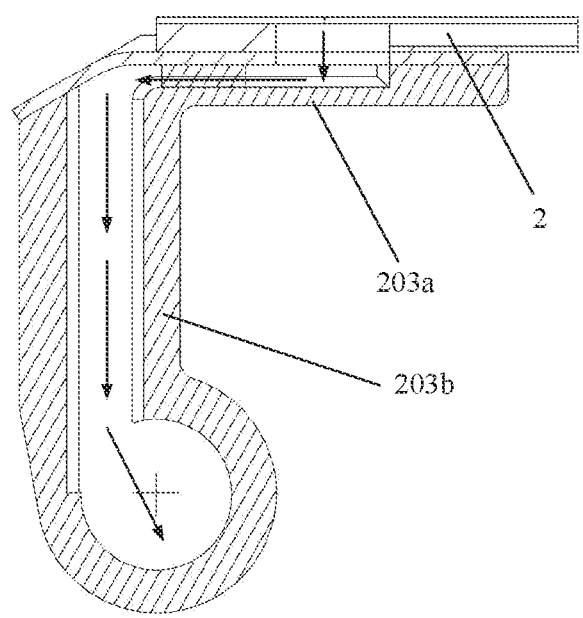
FIG. 19 is a cross-sectional view of F-F in FIG. 18.

Further refer to FIG. 19. FIG. 19 is a cross-sectional view of F-F in FIG. 18. It can be seen from FIG. 19 that, the third adapter 203 has a cavity structure that communicates with the fastening part 203a and the bending part 203b, and a liquid medium in the second liquid channel may enter the cavity structure of the third adapter 203 through the fastening part 203a and flow to the bending part 203b. Arrows in FIG. 19 indicate a flow direction of the liquid medium. It should be understood that, in some embodiments, the liquid medium may alternatively flow in a direction opposite to the direction shown by the arrows in FIG. 19.

In addition, in this application, the third connector 2031 may be disposed at an end that is of the bending part 203b and that faces away from the fastening part 203a. It can be learned from the description of the foregoing embodiment that the second rotating shaft of the first rotating shaft assembly and the fourth rotating shaft of the second rotating shaft assembly may be coaxially disposed. Therefore, in some embodiments of this application, the third connector 2031 may be coaxially disposed with the second rotating shaft and the fourth rotating shaft. In this way, deformation may be absorbed through relative rotation of the third connector 2031 with the second rotating shaft and the fourth rotating shaft on an axis rather than through bending. This may prevent causing an excessively large resistance to flowing of a liquid medium, so that the liquid medium can flow smoothly, and structural reliability of the heat dissipation system may be improved.

Refer to FIG. 18 and FIG. 19. A shape of a cross section of the bending part 203b that faces away from the fastening part 203a may be set to be circular, to effectively increase a flow area of a liquid medium flowing through the third connector 2031. This helps improve smoothness of flowing of the liquid medium at the third interface, so that the heat dissipation system can stably dissipate heat for the electronic device. It may be understood that, in some other possible embodiments of this application, the shape of the cross-section of the bending part 203b that faces away from the fastening part 203a may alternatively be set to a regular shape such as a rectangle, or may use some other possible irregular shapes, provided that the liquid medium can flow smoothly at the bending part 203b.

Similarly, the second heat dissipation panel may be further provided with a fourth adapter 204, the fourth adapter 204 may be provided with a fourth connector 2041, and the fourth connector 2041 may be used as the fourth interface for connecting the second heat dissipation panel to another pipeline. For the fourth adapter 204 and a specific disposing manner of the fourth adapter 204, refer to the third adapter 203. Details are not described herein again.

Figure 20:
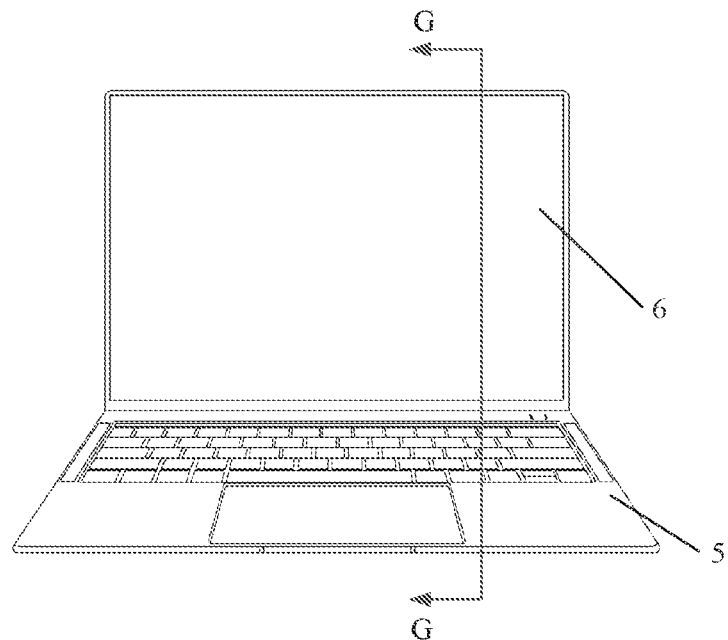
FIG. 20 is a schematic diagram of a structure of a housing of an electronic device according to an embodiment of this application.

After the heat dissipation system provided in this application is understood, the following describes a specific manner of disposing the heat dissipation system in the foldable electronic device. In a possible embodiment of this application, a specific disposing manner of the heat dissipation system in the foldable electronic device is still described by using an example in which the electronic device is a laptop. FIG. 20 is a schematic diagram of a structure of a laptop according to a possible embodiment of this application. FIG. 20 mainly shows a housing structure of the laptop, where the laptop may usually include the first housing 5 and the second housing 6, and the first housing 5 may be provided with but is not limited to elements (which are referred to as heating emitting elements for short) that produce a large quantity of heat, for example, a central processing unit (central processing unit, CPU), a graphics processing unit (graphics processing unit, GPU), a wireless module, or a battery. A display screen component may be disposed in the second housing 6.

Figure 21:
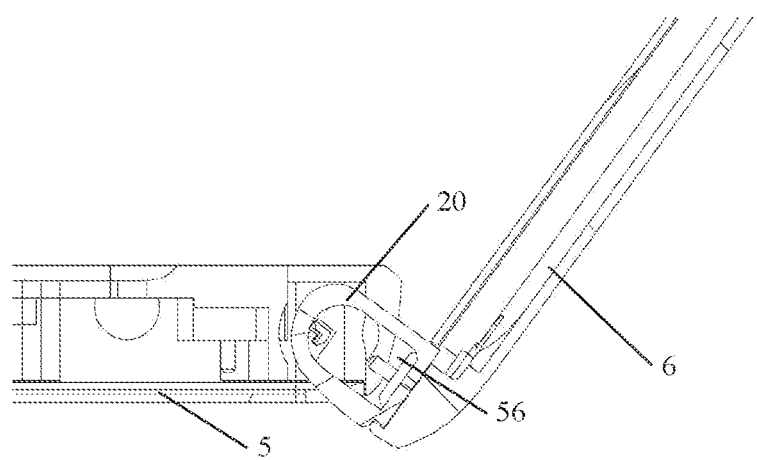
FIG. 21 is a cross-sectional view of G-G in FIG. 20.

Still refer to FIG. 20. In this embodiment, the electronic device is in an expanded state. In addition, refer to FIG. 21. FIG. 21 is an enlarged view of a partial structure of a cross-sectional view of G-G in FIG. 20. In this embodiment of this application, the electronic device may further include a rotating shaft housing 20, and the rotating shaft housing 20 encloses and forms the rotating shaft accommodating space 56. Refer to FIG. 18 and FIG. 21. A specific form of the bending part 203b of the third adapter 203 of the second heat dissipation panel 2 may be set based on a form of the rotating shaft accommodating space 56 enclosed and formed by the rotating shaft housing 20. In addition, when designed, the bending part 203b needs to be in no contact with the rotating shaft housing 20, to avoid interference between the bending part 203b and the rotating shaft housing 20 when the first housing 5 and the second housing 6 rotate relative each other. In some embodiments of this application, a bending shape of the bending part 203b may further match an outline of the rotating shaft housing 20, to ensure neat appearance of the electronic device. For a specific structure of the fourth adapter 204 of the second heat dissipation panel, refer to the third adapter 203. Details are not described herein again.

Figure 22:
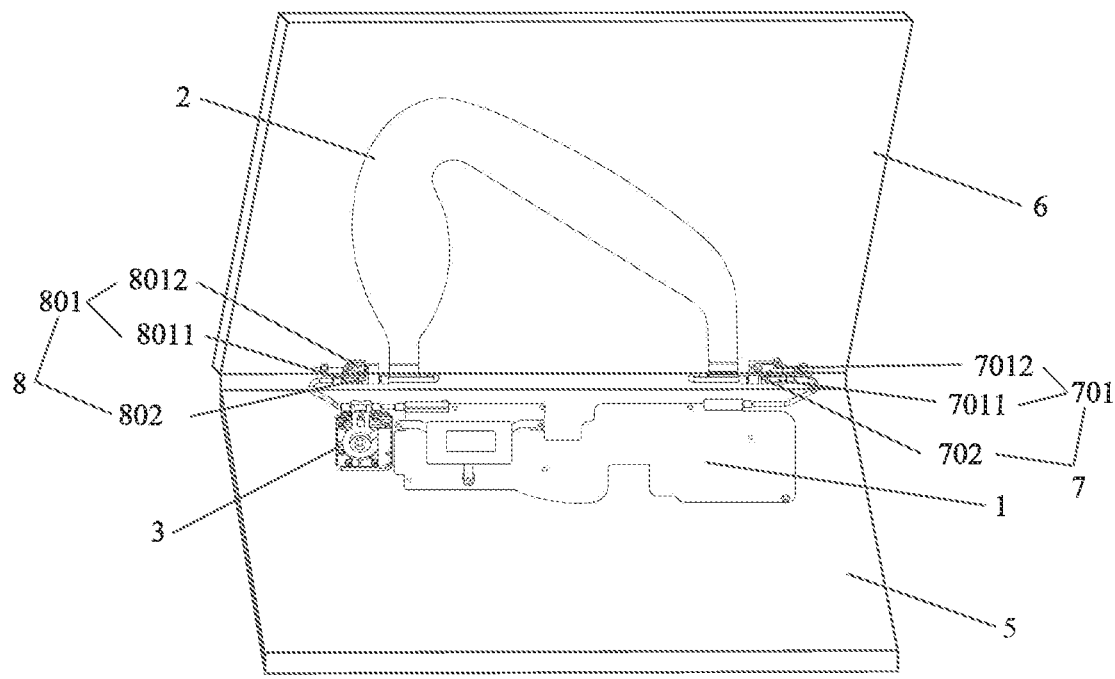
FIG. 22 is a schematic diagram of a structure of an electronic device according to an embodiment of this application.

It can be learned from the description of the foregoing embodiment that the first rotating shaft assembly 7 and the second rotating shaft assembly 8 may be used as supporting structures for relative rotation of the first housing 5 and the second housing 6. When the first housing 5 and the sixth housing 6 are connected through the first rotating shaft assembly 7 and the second rotating shaft assembly 8, refer to FIG. 22. FIG. 22 is a schematic diagram of a structure of an electronic device according to a possible embodiment of this application.

During specific implementation, in the embodiment shown in FIG. 22, the second rotating shaft 702 of the first rotating shaft assembly 7 and the fourth rotating shaft 802 of the second rotating shaft assembly may be fastened to the first housing 5. In some other embodiments, the second rotating shaft 702 of the first rotating shaft assembly 7 and the fourth rotating shaft 802 of the second rotating shaft assembly may be alternatively fastened to the second housing 6.

Refer to FIG. 22. The first rotating shaft 701 of the first rotating shaft assembly 7 may include a first sleeve 7011 and a first connecting part 7012, the first sleeve 7011 is fixedly connected to the first connecting part 7012, the first sleeve 7011 is sleeved on the second rotating shaft 702, and the first connecting part 7012 is fastened to the second housing 6. In addition, the third rotating shaft 801 of the second rotating shaft assembly 8 includes a second sleeve 8011 and a second connecting part 8012, the second sleeve 8011 is fixedly connected to the second connecting part 8012, the second sleeve 8011 is sleeved on the fourth rotating shaft 802, and the second connecting part 8012 is fastened to the second housing 6. In this way, when the first housing 5 and the second housing 6 rotate relative to each other, the first rotating shaft 701 rotates around the second rotating shaft 702, and the third rotating shaft 801 rotates around the fourth rotating shaft 802.

Still refer to FIG. 22. In this embodiment of this application, the first heat dissipation panel 1 and the driving apparatus 3 of the heat dissipation system may be disposed in the first housing 5, and the second heat dissipation panel 2 may be disposed in the second housing 6.

In the electronic device provided in this application, heat generated by a heat emitting element in the first housing 5 may be transferred to a liquid medium in the first heat dissipation panel 1, and the liquid medium carries the heat and enters the second heat dissipation panel 2 through the first rotating shaft assembly 7. Therefore, heat generated on a first housing 5 side may be effectively transferred to the second housing 6 through the rotating shaft accommodating space and dissipated to an environment through the second housing 6. The electronic device uses the heat dissipation system provided in this application, so that a heat dissipation area of the electronic device can be multiplied, to multiply a natural heat dissipation capability of the electronic device. In this way, temperature rises of two housings of the electronic device are not obvious when the electronic device operates, to improve user experience.

In addition, the first heat dissipation panel 1 and the second heat dissipation panel 2 of the heat dissipation system are connected through the first rotating shaft assembly 7 and the second rotating shaft assembly 8. In this way, even if the electronic device needs to be frequently bent, or rotating shaft assembly accommodating space of the electronic device is compact (for example, a bending diameter is less than 7 mm), stable flowing of a liquid medium can be implemented. Therefore, heat dissipation performance of the electronic device can be effectively improved.

It may be understood that, in this application, a shape of the first heat dissipation panel 1 may be designed based on a disposing location of a heat emitting element in the first housing 5 and internal space of the first housing 5, and a shape of the second heat dissipation panel 2 may be designed based on the display screen component in the second housing 6 and internal space of the second housing 6. Therefore, specific shapes of the first heat dissipation panel 1 and the second heat dissipation panel 2 are not limited in this application.

It should be noted that, in the embodiment shown in FIG. 22, a specific disposing manner in which the first housing 5 and the sixth housing 6 are connected through the first rotating shaft assembly 7 and the second rotating shaft assembly 8 is described by using an example of a connection relationship between the heat dissipation system in the embodiment shown in FIG. 9 and the housing of the electronic device. A difference between the heat dissipation system in the embodiment shown in FIG. 9 and the heat dissipation system shown in FIG. 5 lies only in that, in the embodiment shown in FIG. 5, the sixth interface 7022 of the second rotating shaft 702 is connected to the third interface 201 of the second liquid channel through nesting, welding, or the like, and the seventh interface 8021 of the fourth rotating shaft 802 is connected to the fourth interface 202 of the second liquid channel through nesting, welding, or the like. However, in the embodiment shown in FIG. 9, the sixth interface 7022 of the second rotating shaft 702 is connected to the third interface 201 of the second liquid channel through the third hose 12, and the seventh interface 8021 of the fourth rotating shaft 802 is connected to the fourth interface 202 of the second liquid channel through the fourth hose 13. Therefore, when the heat dissipation system in the embodiment shown in FIG. 5 is disposed on the electronic device, for a specific connection manner between the heat dissipation system and the housing of the electronic device, refer to the embodiment shown in FIG. 22. Details are not described herein again.

In addition, the heat dissipation system provided in this application may be further applied to another possible foldable electronic device. For example, the heat dissipation system may be applied to a mobile phone, a wearable device, a tablet computer, a palmtop computer, or the like. Regardless of a kind of the electronic device, for a specific manner of disposing the heat dissipation system in the electronic device, refer to the foregoing embodiment. Details are not described herein again.

Figure 23:
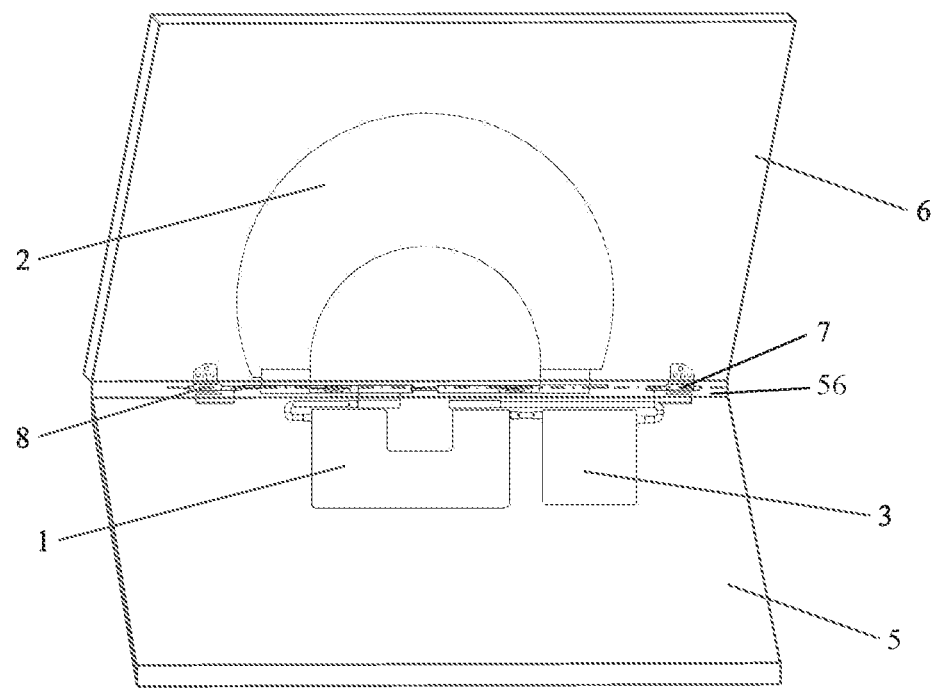
FIG. 23 is a schematic diagram of a structure of an electronic device according to another embodiment of this application.

FIG. 23 is a schematic diagram of a structure of an electronic device according to another embodiment of this application. Different from the embodiment shown in FIG. 22, in this embodiment, a connection between the first heat dissipation panel 1 and the second heat dissipation panel 2 does not depend on structures of the first rotating assembly 7 and the second rotating assembly 8, but is implemented by using an independently disposed connection assembly. In this embodiment, the first rotating shaft assembly 7 and the second rotating shaft assembly 8 are configured to provide supporting force for relative rotation of the first housing 5 and the second housing 6. In addition, in this embodiment, the first heat dissipation panel 1 may be disposed in the first housing 5, the second heat dissipation panel 2 may be disposed in the second housing 6, and a connection assembly configured to connect the first heat dissipation panel 1 and the second heat dissipation panel 2 is disposed in the rotating shaft accommodating space 56.

In this way, a liquid medium in the first liquid channel of the first heat dissipation panel 1 located in the first housing 5 may enter, through the connection assembly, the second liquid channel of the second heat dissipation panel 2 located in the second housing 6, and a liquid medium in the second liquid channel may further return to the first liquid channel through another connection assembly. This implements circularly flowing of the liquid medium between the first liquid channel and the second liquid channel. In this way, after heat generated on a first housing 5 side is absorbed by the first heat dissipation panel 1, the heat is transferred to the second heat dissipation panel 2 on a second housing 6 side by the liquid medium across the rotating shaft accommodating space 56 in a process of circularly flowing of the liquid medium, to implement a heat balance function. This helps increase a heat exchange area between the heat dissipation system and an external environment, and further improves heat dissipation performance of the heat dissipation system.

Figure 24:
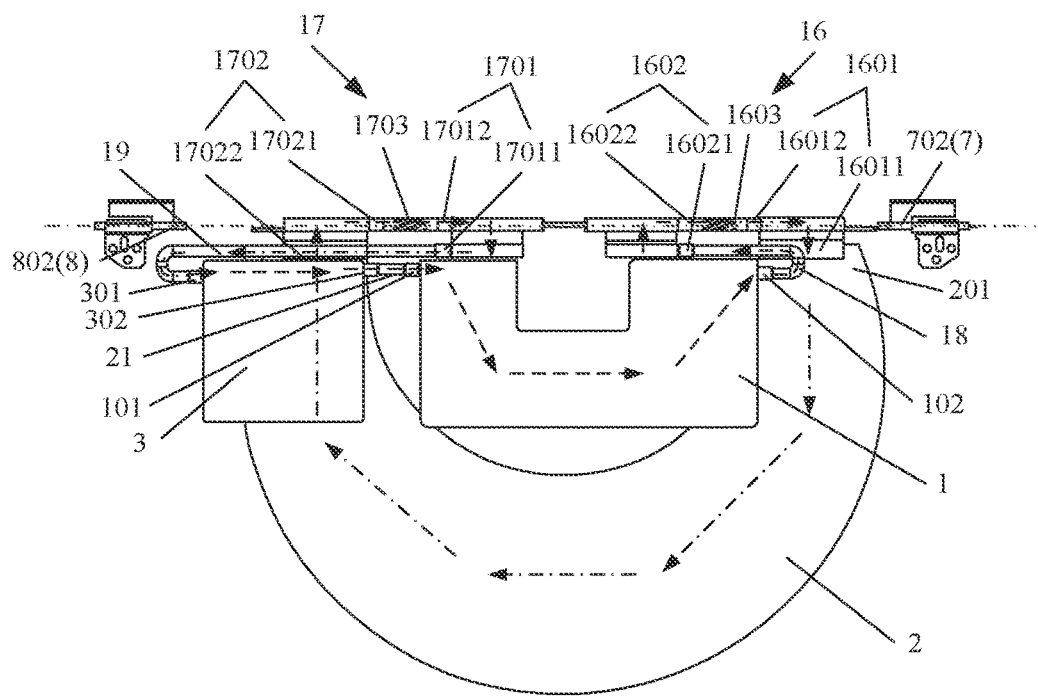
FIG. 24 is a schematic diagram of a structure of a heat dissipation system according to another embodiment of this application.

When the heat dissipation system in this embodiment is specifically disposed, refer to FIG. 24. FIG. 24 shows a schematic diagram of a structure of the heat dissipation system in this embodiment. The second interface 102 and the third interface 201 are connected through the first connection assembly 16. The first connection assembly 16 includes a first connecting piece 1601 and a second connecting piece 1602. The first connecting piece 1601 includes a ninth interface 16011 and a tenth interface 16012. The second connecting piece 1602 includes an eleventh interface 16021 and a twelfth interface 16022. The ninth interface 16011 is connected to the third interface. The tenth interface 16012 is connected to the eleventh interface 16021 through a first connecting pipe 1603. The twelfth interface 16022 is connected to the second interface 102 through a seventh hose 18.

In a possible embodiment of this application, the first connecting pipe 1603 may be a hose, so that the first connecting pipe 1603 deforms when the first heat dissipation panel 1 and the second heat dissipation panel 2 rotate relative to each other, to absorb a portion of twisting. Therefore, structural reliability of the heat dissipation system is improved, and a risk of liquid leakage in the heat dissipation system is reduced. In addition, the first connecting pipe 1603 may be disposed coaxially with the second rotating shaft 702 of the first rotating assembly 7 and the fourth rotating shaft 802 of the second rotating assembly 8. In this embodiment of this application, the second rotating shaft 702 and the fourth rotating shaft 802 may be configured to absorb macroscopic deformation caused by twisting when the first heat dissipation panel 1 and the second heat dissipation panel 2 rotate relative to each other. The first connecting pipe 1603 is coaxially disposed with the second rotating shaft 702 and the fourth rotating shaft 802, so that deformation may be absorbed through twisting of the first connecting pipe 1603 on an axis rather than through bending. This may avoid severe contraction of a cross section of the first connecting pipe 1603 due to collapse of the first connecting pipe 1603 during twisting, thereby further preventing causing an excessively large resistance or a complete blockage to flowing of a liquid medium, and allowing the liquid medium to flow smoothly. In addition, the first connecting pipe 1603 is coaxially disposed with the second rotating shaft 702 and the fourth rotating shaft 802. Therefore, the first connecting pipe 1603, and the first connecting piece 1601 and the second connecting piece 1602 that are connected through the first connecting pipe 1603 may be hidden in the rotating shaft accommodating space 56 used for disposing the first rotating shaft assembly 7 and the second rotating shaft assembly 8. Therefore, appearance of the electronic device is neater.

It should be noted that, in this application, that the first connecting pipe 1603 is disposed coaxially with the second rotating shaft 702, and the fourth rotating shaft 802 may be understood as that axes of the first connecting pipe 1603, the second rotating shaft 702, and the fourth rotating shaft 802 completely overlap, or the axes of the first connecting pipe 1603, the second rotating shaft 702, and the fourth rotating shaft 802 are misplaced in a small range.

Similarly, in another possible embodiment of this application, the liquid inlet 301 of the driving apparatus 3 and the fourth interface 202 of the second heat dissipation panel 2 may be connected through a second connection assembly 17. The second connection assembly 17 includes a third connecting piece 1701 and a fourth connecting piece 1702. The third connecting piece 1701 includes a thirteenth interface 17011 and a fourteenth interface 17012. The fourth connecting piece 1702 includes a fifteenth interface 17021 and a sixteenth interface 17022. The thirteenth interface 17011 is connected to the liquid inlet 301. The fourteenth interface 17012 is connected to the fifteenth interface 17021 through a second connecting pipe 1703. The sixteenth interface 17022 is connected to the fourth interface through an eighth hose 19.

In a possible embodiment of this application, the second connecting pipe 1703 may be a hose, so that the second connecting pipe 1703 deforms when the first heat dissipation panel 1 and the second heat dissipation panel 2 rotate relative to each other, to absorb a portion of twisting. Therefore, structural reliability of the heat dissipation system is improved, and a risk of liquid leakage in the heat dissipation system is reduced. In addition, the second connecting pipe 1703 may be disposed coaxially with the second rotating shaft 702 of the first rotating assembly 7 and the fourth rotating shaft 802 of the second rotating assembly 8. In this embodiment of this application, the second rotating shaft 702 and the fourth rotating shaft 802 may be configured to absorb macroscopic deformation caused by twisting when the first heat dissipation panel 1 and the second heat dissipation panel 2 rotate relative to each other. The second connecting pipe 1703 is coaxially disposed with the second rotating shaft 702 and the fourth rotating shaft 802, so that deformation may be absorbed through twisting of the second connecting pipe 1703 on an axis rather than through bending. This may avoid severe contraction of a cross section of the second connecting pipe 1703 due to collapse of the second connecting pipe 1703 during twisting, thereby further preventing causing an excessively large resistance or a complete blockage to flowing of a liquid medium, and allowing the liquid medium to flow smoothly. In addition, the second connecting pipe 1703 is coaxially disposed with the second rotating shaft 702 and the fourth rotating shaft 802. Therefore, the second connecting pipe 1703, and the third connecting piece 1701 and the fourth connecting piece 1702 that are connected through the second connecting pipe 1703 may be hidden in the rotating shaft accommodating space used for disposing the first rotating shaft assembly 7 and the second rotating shaft assembly 8. Therefore, appearance of the electronic device is neater.

It should be noted that, in this application, that the second connecting pipe 1703 is disposed coaxially with the second rotating shaft 702 and the fourth rotating shaft 802 may be understood as that axes of the second connecting pipe 1703, the second rotating shaft 702, and the fourth rotating shaft 802 completely overlap, or the axes of the second connecting pipe 1703, the second rotating shaft 702, and the fourth rotating shaft 802 are misplaced in a small range.

In FIG. 24, flowing of a liquid medium in the heat dissipation system is indicated by arrows. During specific implementation, according to the heat dissipation system provided in this embodiment of this application, a dotted line with an arrow indicates flowing of a liquid medium between the driving apparatus 3 and the first heat dissipation panel 1, and under an action of driving force of the driving apparatus 3, the liquid medium flows out from the liquid outlet 302 of the driving apparatus 3, and enters the first heat dissipation panel 1 through the first interface 101. After flowing through the first heat dissipation panel 1, the liquid medium flows out from the second interface 102, and enters the second connecting piece 1602 through the eleventh interface 16021 of the second connecting piece 1602 through the seventh hose 18. Then, the liquid medium flows through the second connecting piece 1602 and flows out from the twelfth interface 16022, flows through the first connecting pipe 1603, and enters the first connecting piece 1601 through the tenth interface 16012. Then, the liquid medium flows through the first connecting piece, and enters the second heat dissipation panel 2 through the ninth interface 16011 and the third interface 201. In FIG. 24, a dash-single dot line with an arrow indicates flowing of a liquid medium in the second heat dissipation panel 2. After flowing through the second heat dissipation panel 2, the liquid medium flows out from the fourth interface, and enters the fourth connecting piece 1702 through the sixteenth interface 17022. Then, the liquid medium flows through the fourth connecting piece 1702, flows out from the fifteenth interface 17021, flows through the second connecting pipe 1703, and enters the third connecting piece 1701 from the fourteenth interface 17012. Finally, after flowing through the third connecting piece 1701, the liquid medium flows out from the thirteenth interface 17011, and enters the driving apparatus 3 through the liquid inlet 301 through the eighth hose 19. At this point, one time of circulation of the liquid medium in the heat dissipation system is completed.

According to the heat dissipation system provided in this application, when a liquid medium circulates in the heat dissipation system, heat generated by the electronic device may be brought to various locations of the heat dissipation system, to implement temperature balance effect. This helps increase an area in which the heat dissipation system exchanges heat with an external environment, so that heat dissipation performance of the heat dissipation system is improved.

In the embodiment shown in FIG. 24, a manner in which a metal crimping ring is used for crimping mentioned in the foregoing embodiment is used between the first connecting pipe 1603 and the tenth interface 16012 and the twelfth interface 16022, between the second connecting pipe 1703 and the fourteenth interface 17012 and the sixteenth interface 17022, between the seventh hose 18 and the second interface 102 and the eleventh interface 16021, and between the eighth hose 19 and the liquid inlet 301 and the thirteenth interface 17011. In addition, specific structures of the first heat dissipation panel 1, the second heat dissipation panel 2, and the driving apparatus 3 of the heat dissipation system may be set with reference to the foregoing embodiment. Details are not described herein again. Further refer to FIG. 24. The liquid outlet 302 of the driving apparatus 3 may alternatively be connected to the first interface 101 of the first heat dissipation panel 1 through a ninth hose 21. The ninth hose 21 may be fastened to the liquid outlet and the first interface 101 by using the manner in which a metal crimping ring is used for crimping mentioned in the foregoing embodiment.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A heat dissipation system comprising:
  a first heat dissipation panel comprising a first liquid channel comprising:
    a first interface; and
    a second interface;
  a second heat dissipation panel comprising a second liquid channel comprising:
    a third interface; and
    a fourth interface;
  a first rotating shaft assembly comprising:
    a first rotating shaft rotatably coupled with a second rotating shaft, wherein the second rotating shaft is a first hollow shaft, wherein the second interface is coupled to the third interface through the second rotating shaft;
  a second rotating shaft assembly comprising:
    a third rotating shaft rotatably coupled with a fourth rotating shaft, wherein the fourth rotating shaft is a second hollow shaft; and
  a driving apparatus comprising:
    a liquid outlet coupled to the first interface; and
    a liquid inlet, wherein the fourth interface is coupled to the liquid inlet through the fourth rotating shaft,
  wherein the driving apparatus is configured to drive a liquid medium to flow in the first liquid channel, the second liquid channel, the second rotating shaft, and the fourth rotating shaft.

2. The heat dissipation system of claim 1, wherein the first rotating shaft and the second rotating shaft of the first rotating shaft assembly are coaxially disposed, and wherein the third rotating shaft and the fourth rotating shaft of the second rotating shaft assembly are coaxially disposed.

3. The heat dissipation system of claim 1, wherein the second rotating shaft comprises:
a fifth interface coupled to the second interface; and
a sixth interface coupled to the third interface, and
wherein the fourth rotating shaft comprises:
a seventh interface coupled to the fourth interface; and
an eighth interface coupled to the liquid inlet.

4. The heat dissipation system of claim 3, further comprising:
a first hose; and
a second hose,
wherein the eighth interface is coupled to the liquid inlet through the first hose, and
wherein the second interface is coupled to the fifth interface through the second hose.

5. The heat dissipation system of claim 4, further comprising:
a first metal crimping ring;
a second metal crimping ring;
a third metal crimping ring; and
a fourth metal crimping ring, wherein the first hose comprises:
a first end crimped with the eighth interface through the first metal crimping ring; and
a second end crimped with the liquid inlet through the second metal crimping ring, and
wherein the second hose comprises:
a third end crimped with the second interface through the third metal crimping ring; and
a fourth end crimped with the fifth interface through the fourth metal crimping ring.

6. The heat dissipation system of claim 3, further comprising:
a first hose; and
a second hose,
wherein the sixth interface is coupled to the third interface through the first hose, and
wherein the fourth interface is coupled to the seventh interface through the second hose.

7. The heat dissipation system of claim 6, further comprising:
a first metal crimping ring;
a second metal crimping ring;
a third metal crimping ring; and
a fourth metal crimping ring,
wherein the first hose comprises:
a first end crimped with the sixth interface through the first metal crimping ring; and
a second end crimped with the third interface through the second metal crimping ring, and
wherein the second hose comprises:
a third end crimped with the fourth interface through the third metal crimping ring; and
a fourth end crimped with the seventh interface through the fourth metal crimping ring.

8. The heat dissipation system of claim 3, wherein the sixth interface is nested in the third interface and the sixth interface is fixedly coupled to the third interface, or wherein the seventh interface is nested in the fourth interface and the seventh interface is fixedly coupled to the fourth interface.

9. The heat dissipation system of claim 3, further comprising:
a first sealing ring, wherein the sixth interface is nested in the third interface, wherein the first sealing ring is disposed between the sixth interface and the third interface and is in interference fit with the sixth interface and the third interface; or
a second sealing ring, wherein the seventh interface is nested in the fourth interface, wherein the second sealing ring is disposed between the seventh interface and the fourth interface and is in interference fit with the seventh interface and the fourth interface.

10. The heat dissipation system of claim 3, further comprising:
a nested mechanical part sleeved at a joint between the sixth interface and the third interface;
a first sealing ring disposed between the nested mechanical part and the sixth interface and is in interference fit with the nested mechanical part and the sixth interface; and
a second sealing ring disposed between the nested mechanical part and the third interface and is in interference fit with the nested mechanical part and the third interface.

11. The heat dissipation system of claim 8, wherein the sixth interface is rotatably coupled to the third interface, and wherein the seventh interface is rotatably coupled to the fourth interface.

12. The heat dissipation system of claim 1, further comprising:
a first hose penetrating the second rotating shaft and comprising:
a first end coupled to the second interface; and
a second end coupled to the third interface; and
a second hose passing through the fourth rotating shaft and comprising:
a third end coupled to the fourth interface; and
a fourth end coupled to the liquid inlet.

13. The heat dissipation system of claim 1, wherein the first heat dissipation panel further comprises:
a first adapter in communication with the first liquid channel and comprising a first connector that is used as the first interface; and
a second adapter in communication with the first liquid channel and comprising a second connector that is used as the second interface.

14. The heat dissipation system of claim 1, wherein the second heat dissipation panel further comprises:
a first adapter in communication with the second liquid channel and comprising a first connector that is used as the third interface; and
a second adapter in communication with the second liquid channel and comprising a second connector that is used as the fourth interface.

15. The heat dissipation system of claim 14, wherein the first adapter further comprises:
a fastening part fixedly coupled to the second heat dissipation panel; and
a bending part bent from the fastening part toward a direction of the first heat dissipation panel and comprising an end facing away from the fastening part, wherein the first connector is disposed at the end.

16. A heat dissipation system comprising:
a first connecting pipe comprising a first hose;
a second connecting pipe comprising a second hose
a first heat dissipation panel comprising a first liquid channel comprising:
a first interface; and
a second interface;
a second heat dissipation panel comprising a second liquid channel comprising:
a third interface; and a fourth interface;
a first connection assembly comprising:
  a first connecting piece comprising:
    a fifth interface coupled to the third interface; and
    a sixth interface; and
  a second connecting piece comprising:
    a seventh interface coupled to the sixth interface through the first connecting pipe; and
    an eighth interface coupled to the second interface;
a second connection assembly comprising:
  a third connecting piece comprising:
    a ninth interface; and
    a tenth interface; and
  a fourth connecting piece comprising:
    an eleventh interface coupled to the tenth interface through the second connecting pipe; and
    a twelfth interface coupled to the fourth interface; and
a driving apparatus comprising:
  a liquid outlet; and
  a liquid inlet coupled to the ninth interface, and
wherein the driving apparatus is configured to drive a liquid medium to flow in the first liquid channel, the second liquid channel, the first connection assembly, and the second connection assembly.

17. The heat dissipation system of claim 16, wherein the first heat dissipation panel further comprises:
a first adapter in communication with the first liquid channel and comprising a first connector that is used as the first interface; and
a second adapter in communication with the first liquid channel and comprising a second connector that is used as the second interface.

18. The heat dissipation system of claim 16, wherein the second heat dissipation panel further comprises:
a first adapter in communication with the second liquid channel and comprising a first connector that is used as the third interface; and
a second adapter in communication with the second liquid channel and comprising a second connector that is used as the fourth interface.

19. The heat dissipation system of claim 18, wherein the first adapter comprises:
a fastening part fixedly coupled to the second heat dissipation panel; and
a bending part bent from the fastening part toward a direction of the first heat dissipation panel and comprising an end facing away from the fastening part,
wherein the first connector is disposed at the end.

20. The heat dissipation system of claim 16, further comprising:
a third hose; and
a fourth hose,
wherein the eighth interface is coupled to the second interface through the third hose, and
wherein the twelfth interface is coupled to the fourth interface through the fourth hose.

\* \* \* \* \*